United States Patent
Hamada et al.

(10) Patent No.: US 12,515,443 B2
(45) Date of Patent: Jan. 6, 2026

(54) MULTILAYER FOAM SHEET

(71) Applicant: SEKISUI CHEMICAL CO., LTD., Osaka (JP)

(72) Inventors: Masahiro Hamada, Shiraoka (JP); Masaya Ishida, Hasuda (JP); Hiroki Matsukawa, Koshigaya (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 182 days.

(21) Appl. No.: 18/019,949

(22) PCT Filed: Aug. 10, 2021

(86) PCT No.: PCT/JP2021/029576
§ 371 (c)(1),
(2) Date: Feb. 6, 2023

(87) PCT Pub. No.: WO2022/030649
PCT Pub. Date: Feb. 10, 2022

(65) Prior Publication Data
US 2023/0321959 A1 Oct. 12, 2023

(30) Foreign Application Priority Data

Aug. 7, 2020 (JP) ................................. 2020-135394
Aug. 7, 2020 (JP) ................................. 2020-135395
Aug. 7, 2020 (JP) ................................. 2020-135397

(51) Int. Cl.
*B32B 27/06* (2006.01)
*B32B 5/18* (2006.01)
*B32B 7/02* (2019.01)
*B32B 27/32* (2006.01)

(52) U.S. Cl.
CPC ............. *B32B 27/065* (2013.01); *B32B 5/18* (2013.01); *B32B 7/02* (2013.01); *B32B 27/32* (2013.01); *B32B 2250/40* (2013.01); *B32B 2266/025* (2013.01); *B32B 2266/0292* (2013.01); *B32B 2266/08* (2013.01); *B32B 2266/10* (2016.11); *B32B 2266/12* (2016.11); *B32B 2307/54* (2013.01); *B32B 2307/72* (2013.01); *B32B 2307/7376* (2023.05); *B32B 2405/00* (2013.01)

(58) Field of Classification Search
CPC ............ B32B 2250/03; B32B 2250/40; B32B 27/065
See application file for complete search history.

(56) References Cited

U.S. PATENT DOCUMENTS

| | | | | |
|---|---|---|---|---|
| 2003/0166733 A1* | 9/2003 | Miyazaki | ........... | A41D 13/0156 516/115 |
| 2008/0076310 A1* | 3/2008 | Kishioka | .................. | C09J 7/205 442/65 |
| 2009/0169860 A1* | 7/2009 | Katsunori | .................. | C08J 9/10 428/340 |

FOREIGN PATENT DOCUMENTS

| | | | |
|---|---|---|---|
| JP | 54-72282 | | 6/1979 |
| JP | 9-254293 | | 9/1997 |
| JP | 2005131952 A | * | 5/2005 |
| JP | WO2018/181486 | | 10/2018 |
| JP | 2019-171819 | | 10/2019 |
| JP | 2019-177668 | | 10/2019 |
| JP | 2019-178293 | | 10/2019 |
| JP | 2020-32599 | | 3/2020 |
| JP | 2022063244 A | * | 4/2022 |
| KR | 10-0765802 | | 10/2007 |
| KR | 100765802 B1 | * | 10/2007 |
| WO | 2019/189452 | | 10/2019 |
| WO | 2020/158886 | | 8/2020 |

OTHER PUBLICATIONS

Translation of Japanese Industrial Standard: JIS K 6767 : 1999, accessed Jul. 2, 2025.*
International Search Report (ISR) issued Oct. 26, 2021 in International (PCT) Application No. PCT/JP2021/029576.

* cited by examiner

*Primary Examiner* — Alicia J Weydemeyer
(74) *Attorney, Agent, or Firm* — Wenderoth, Lind & Ponack, L.L.P.

(57) ABSTRACT

A multilayer foam sheet having a resin layer and a foam layer on each of both sides of the resin layer, wherein the thickness of the resin layer is 10 μm or more, and the 25% compressive strength is 1000 kPa or less. A foam sheet having high impact resistance and flexibility can be provided.

17 Claims, No Drawings

MULTILAYER FOAM SHEET

TECHNICAL FIELD

The present invention relates to a multilayer foam sheet, for example, to a multilayer foam sheet to be used for cushioning materials for displays, sealing materials for displays, and the like.

BACKGROUND ART

In mobile electronic devices such as notebook personal computers, mobile phones, smartphones, and tablets, a display device may be provided with a cushioning material disposed on the back side in order to prevent damage or failure. The cushioning material is required to have high flexibility, and a foam sheet has been widely used, conventionally.

In recent years, the housings of devices become larger, as electronic devices become more sophisticated. Further, applications other than standing use on a flat ground like conventional use, such as smartphones and tablets that are used while being carried around and wall-mounted televisions that are installed in commercial facilities are increasing. As a result, the risk of dropping such a device is increasing, and the risk of breakage between its panel and housing is also increasing, accordingly. Therefore, a method for fixing the panel and housing, which is less likely to cause breakage is being sought, and there is a demand for a foam sheet with higher impact resistance.

Further, as the screen size of electronic devices such as smartphones increases, the bonding area between a screen and a housing is becoming smaller. For example, the width of a foam tape (bonding area) becomes smaller as the screen size increases while the outer dimensions of the screen remain the same. Accordingly, the foam tape is required to have a better impact resistance than ever before. Under such circumstances, a cushioning material for electronic parts comprising a foamed resin layer containing a polyolefin resin and a skin resin layer containing a polyethylene resin on at least one surface of the foamed resin layer has been proposed (see PTL1).

Further, the foam sheets used inside electronic devices are used for the purpose of cushioning and water resistance. As electronic devices become smaller and thinner, it is required to be thin while satisfying the required properties such as cushioning and water resistance.

However, as the foam sheet becomes thinner, the mechanical strength such as tensile strength tends to decrease. Therefore, for example, in the case of using such a foam sheet as a pressure-sensitive adhesive tape, it is likely to be damaged during rework or the like. Under such circumstances, a cushioning material for electronic parts provided with the aforementioned foamed resin layer containing a polyolefin resin and a skin resin layer containing a polyethylene resin on at least one surface of the foamed resin layer has been proposed (see PTL1).

Further, an extrusion molding process may be used in producing foam sheets. The foam sheets created by the extrusion molding process tend to have a feature that the material strength in the extrusion direction (MD direction: Machine Direction) is high, and the material strength in the vertical direction (TD direction: Transverse Direction) is low, due to the effect of resin orientation. As a result, damage in the TD direction is likely to occur.

Further, electronic devices are becoming more sophisticated, and a typical performance is waterproofing function. As a method of waterproofing a device, there is a method of sealing the frame of a housing with a tape to prevent direct entry of water into the housing. When using this method, it is said that a foam tape that is more flexible and easier to follow the frame is preferable to tapes made of a hard material (e.g., see PTL2).

CITATION LIST

Patent Literature

PTL1: JP 2019-171819 A
PTL2: JP 2019-178293 A

SUMMARY OF INVENTION

Technical Problem

The cushioning material disclosed in PTL1 has high tensile strength, low compressive strength, and excellent reworkability. However, there is room for improvement in terms of flexibility, such as step followability and adhesiveness.

Further, the performance difference occurs due to the difference in material strength between the MD direction and the TD direction, depending on the direction of use, and there is, for example, a possibility that problems such as sheet breakage when the sheet is peeled off may occur. As a countermeasure, a method of reducing the density of the entire sheet in order to increase the tensile strength is conceivable, but in such a case, the flexibility may decrease at the same time, and the original function such as waterproofness may be impaired.

The pressure-sensitive adhesive tape described in PTL2 exhibits good waterproofness but is difficult to handle because it is a flexible foam. For example, when the sheet is stretched during transportation for production or processing, there is a problem that shrinkage or the like subsequently occurs, resulting in warpage or the like.

Therefore, it is an object of the present invention (first invention) to provide a foam sheet that has high impact resistance and high flexibility. Further, it is an object of the present invention (second invention) to provide a multilayer foam sheet that has good waterproofness and is easy to handle. Moreover, it is an object of the present invention (third invention) to provide a foam sheet that has high impact resistance, flexibility, and high tensile strength with no difference in strength between the MD direction and the TD direction.

Solution to Problem

As a result of diligent studies, the inventors have found that a multilayer sheet in which a resin layer with specific performance and a flexible foam layer are stacked can solve the aforementioned problems, thereby accomplishing the present invention. That is, the present invention provides [1] to below.

[1] A multilayer foam sheet having a resin layer and a foam layer on each of both sides of the resin layer, wherein the thickness of the resin layer is 10 μm or more, and the 25% compressive strength is 1000 kPa or less.

[2] A multilayer foam sheet having a resin layer and a foam layer on at least one surface of the resin layer, wherein the tension value upon stretching by 1% is 0.50 N/10 mm or more, and the 25% compressive strength is 1000 kPa or less.

[3] A multilayer foam sheet having a foam layer on each of both sides of a resin layer, wherein the 25% compressive strength is 1000 kPa or less, and the ratio of the MD tensile strength at break to the TD tensile strength at break (MD/TD) is 1.40 or less.

[4] The multilayer foam sheet according to [1] above, wherein the thickness of the resin layer is 20 μm or more.

[5] The multilayer foam sheet according to [1] or [4] above, wherein the tensile strength at break in the machine direction (MD) is 10 N/10 mm or more. [6] The multilayer foam sheet according to [1], [4], or [5] above, wherein the density of the entire sheet is 0.1 to 0.8 g/cm³.

[7] The multilayer foam sheet according to any one of [1] and [4] to [6], wherein the total thickness is in the range of 30 to 2000 μm.

[8] The multilayer foam sheet according to any one of [1] and [4] to [7], wherein the gel fraction is 30 to 80%.

[9] The multilayer foam sheet according to any one of [1] and [4] to [8], wherein the density of the foam layer is 0.05 to 0.7 g/cm³.

[10] The multilayer foam sheet according to any one of [1] and [4] to [9], wherein the resin constituting the resin layer is a polyolefin resin.

[11] The multilayer foam sheet according to any one of [1] and [4] to [10], wherein the closed cell ratio of the foam layer is 90% or more.

[12] The multilayer foam sheet according to any one of [1] and [4] to [11], wherein the ratio of thicknesses of the foam layer to the resin layer (foam layer/resin layer) is 1 to 10.

[13] The multilayer foam sheet according to any one of [1] and [4] to [12], wherein the resin constituting the foam layer having a polyolefin resin, or a polyolefin resin and at least one selected from a thermoplastic elastomer and olefin rubber.

[14] The multilayer foam sheet according to [2] above, wherein the thickness of the resin layer is 5 μm or more.

[15] The multilayer foam sheet according to [2] or above, wherein the total thickness is 50 to 1000 μm.

[16] The multilayer foam sheet according to [2], [14], or above, wherein the resin layer is a middle layer, and the foam layer is an outer layer.

[17] The multilayer foam sheet according to any one of [2] and to [16], having a foam layer on each of both sides of the resin layer.

[18] The multilayer foam sheet according to any one of [2] and to [17], wherein the closed cell ratio is 80% or more.

[19] The multilayer foam sheet according to any one of [2] and to [18], wherein the average cell diameter is 20 to 350 μm.

[20] The multilayer foam sheet according to any one of [2] and to [19], wherein the apparent density of the foam layer is 0.05 to 0.75 g/cm³.

[21] The multilayer foam sheet according to any one of claims [2] and to above, wherein the crosslinking ratio is 30 mass % or more.

[22] The multilayer foam sheet according to [3] above, wherein the density of the entire sheet is 0.1 to 0.8 g/cm³.

[23] The multilayer foam sheet according to [3] or above, wherein the MD tensile strength at break is 15 N/10 mm or more.

[24] The multilayer foam sheet according to [3], [22], or above, wherein the total thickness is in the range of 30 to 2000 μm.

[25] The multilayer foam sheet according to any one of [3] and to [24], wherein the gel fraction is 30 to 80%.

[26] The multilayer foam sheet according to any one of [3] and to [25], wherein the density of the foam layer is 0.08 to 0.7 g/cm³.

[27] The multilayer foam sheet according to any one of [3] and to [26], wherein each of the resin layer and the foam layer contains a polyolefin resin, or a polyolefin resin and at least one selected from a thermoplastic elastomer and olefin rubber.

[28] The multilayer foam sheet according to any one of [3] and to [27], wherein the closed cell ratio of the foam layer is 90% or more.

[29] The multilayer foam sheet according to any one of [3] and to [28], wherein the ratio of thicknesses of the foam layer to the resin layer (foam layer/resin layer) is 5 or less.

[30] A pressure-sensitive adhesive tape having a pressure sensitive adhesive material on at least one surface of the multilayer foam sheet according to any one of [1] to [29].

[31] A rolled product having the multilayer foam sheet according to any one of [3] and [22] to [28].

Advantageous Effects of Invention

The present invention (first invention) can provide a multilayer foam sheet having high impact resistance and flexibility. Further, the multilayer foam sheet of the present invention (second invention) is excellent in waterproofness and handleability. For example, when used as a tape for fixing a panel of a device, it can prevent water from entering the device. Further, the present invention (third invention) can provide a foam sheet having high impact resistance, flexibility, high waterproofness, and high tensile strength with no difference in strength between the MD direction and the TD direction.

DESCRIPTION OF EMBODIMENTS

Hereinafter, the multilayer foam sheet of the present invention will be described more in detail.

[Multilayer Foam Sheet] (First Invention)

The multilayer foam sheet of the present invention (first invention) has a resin layer and a foam layer on each of both sides of the resin layer, wherein the thickness of the resin layer is 10 μm or more, and the 25% compressive strength is 1000 kPa or less.

In the multilayer foam sheet of the present invention (first invention), the resin layer constitutes a middle layer, and the foam layer constitutes each outer layer. The outer layer means the outermost layer of the multilayer foam sheet, and the middle layer means an inner layer other than the outermost layer.

With such a three-layer structure, the flexibility can be ensured, and the impact resistance is excellent. The configurations of the two outer layers on the front and back of the middle layer may be the same or different, but they preferably have the same configuration in view of ease of production.

The foam layer (outer layer) may be directly stacked on the resin layer (middle layer), or may be stacked thereon via an intermediate layer such as an adhesive layer. Further, a multilayer structure of 4 or more layers may be employed, as long as a resin layer as a middle layer and a foam layer as an outermost layer are provided.

<Thickness>
(Thickness of Resin Layer)

In the multilayer foam sheet of the present invention (first invention), the resin layer as a middle layer has a thickness of 10 μm or more. When the thickness is less than 10 μm, a sufficient impact resistance cannot be obtained. From the aforementioned viewpoint, the thickness of the resin layer is preferably 15 μm or more, more preferably 20 μm or more.

Further, the thickness of the resin layer is preferably 200 μm or less, more preferably 150 μm or less, further preferably 120 μm or less, furthermore preferably 100 μm or less. When the thickness is such an upper limit or less, the total thickness of the multilayer foam sheet (which may be hereinafter referred to as "total thickness") can be reduced, so that the multilayer foam sheet can be suitably used for thin electronic devices such as smartphones and tablets.

(Thickness of Foam Layer)

The thickness of the foam layer is preferably in the range of 10 to 1000 μm, more preferably in the range of 30 to 700 μm, further preferably in the range of 50 to 500 μm, furthermore preferably 50 to 295 μm. When the thickness is such a lower limit or more, a sufficient impact resistance can be exerted, and when it is the aforementioned upper limit or less, the total thickness of the multilayer foam sheet can be reduced, so that the multilayer foam sheet can be suitably used for thin electronic devices such as smartphones and tablets.

(Total Thickness)

The multilayer foam sheet of the present invention (first invention) preferably has a total thickness in the range of 30 to 2000 μm. When the total thickness is 30 μm or more, a sufficient flexibility as well as a sufficient impact resistance can be obtained, and when the total thickness is 2000 μm or less, the thickness can be reduced, and the multilayer foam sheet can be suitably used for thin electronic devices such as smartphones and tablets.

From these viewpoints, the total thickness of the multilayer foam sheet is more preferably 70 to 1800 μm, further preferably 100 to 1500 μm, furthermore preferably 120 to 600 μm.

The thickness can be measured by a dial gauge.

(Ratio of Thicknesses of Outer Layer to Middle Layer)

The thickness of each of the outer layer (foam layer) and the middle layer (resin layer) is as described above, and the ratio of thicknesses of the outer layer to the middle layer (outer layer/middle layer) is preferably in the range of 1 to 10, more preferably in the range of 1.2 to 8, further preferably in the range of 1.3 to 6, even more preferably 1.8 to 5.5. When the ratio of thicknesses is such a lower limit or more, an excellent impact resistance is obtained, and when it is the aforementioned upper limit or less, a good handleability is obtained.

<Compressive Strength>

The multilayer foam sheet of the present invention (first invention) has a 25% compressive strength of 1000 kPa or less. When the 25% compressive strength is over 1000 kPa, flexibility (followability) and cushioning properties cannot be obtained. From the aforementioned viewpoint, the 25% compressive strength is preferably 900 kPa or less, more preferably 800 kPa or less, further preferably 650 kPa or less.

The lower limit is not particularly limited but is generally about 10 kPa, preferably 20 kPa or more.

The 25% compressive strength is a value measured at a measurement temperature of 23° C. by a measurement method according to JIS K 6767.

<Tensile Strength at Break>

In the multilayer foam sheet of the present invention (first invention), the tensile strength at break in the machine direction (MD) at 23° C. is preferably 10 N/10 mm or more. When the tensile strength at break is 10 N/10 mm or more, a good impact resistance is obtained. From the aforementioned viewpoint, the tensile strength at break is more preferably 20 N/10 mm or more, further preferably 25 N/10 mm or more.

The upper limit of the tensile strength at break is not particularly limited but is generally about 100 N/10 mm, preferably 80 N/10 mm or less, more preferably 60 N/10 mm or less.

When the MD direction is unknown, the direction with the highest tensile breaking strength is taken as the MD direction. The tensile strength at break is a value measured by the method described in Examples.

<Overall Density>

The overall density refers to the apparent density of the entire multilayer foam sheet of the present invention (first invention) and is preferably 0.1 to 0.8 g/cm$^3$, more preferably 0.15 to 0.7 g/cm$^3$.

When the apparent density falls within the aforementioned range, the flexibility, the cushioning properties, and the like of the multilayer foam sheet are easily improved. Further, it becomes easier to impart a certain mechanical strength to the multilayer foam sheet and to improve the impact resistance. The apparent density is a value measured according to JIS K 7222 (2005).

Further, the apparent density of the foam layer is preferably 0.05 to 0.7 g/cm$^3$, more preferably 0.15 to 0.65 g/cm$^3$, further preferably 0.18 to 0.60 g/cm$^3$. When it falls within such a range, the impact resistance and the flexibility are improved.

<Closed Cell Ratio>

In the multilayer foam sheet of the present invention (first invention), the closed cell ratio of the foam layer is preferably 90% or more. The closed cell ratio of 90% or more can secure the impact resistance. From the aforementioned viewpoint, the closed cell ratio of the foam layer is further preferably 92% or more. The higher the closed cell ratio, it is more preferable, and it needs only to be 100% or less. Further, not only the impact resistance but also the cushioning properties are improved, and the original elasticity of the multilayer foam sheet can be easily maintained even after heating or cooling. There is also an advantage that the rate of change in compressive strength or the like tends to be low.

The closed cell ratio is measured by the method described in Examples.

<Average Cell Diameter>

The multilayer foam sheet of the present invention (first invention) preferably has an average cell diameter of 20 to 350 μm. When the average cell diameter falls within the aforementioned range, good cushioning properties are obtained, and a good surface smoothness of the multilayer foam sheet is obtained, so that it is not difficult to mount the housing of the device.

From the aforementioned viewpoint, the average cell diameter is more preferably 20 to 320 μm, further preferably 30 to 300 μm.

The average cell diameter in the present invention (first invention) is the larger value of the average cell diameters in the machine direction (MD) and in the direction perpendicular to the MD (TD: Transverse Direction).

Further, the average cell diameter is measured by the method described in Examples.

(Crosslinking Ratio (Gel Fraction))

The multilayer foam sheet of the present invention (first invention) is preferably crosslinked, and the crosslinking ratio represented by the gel fraction is preferably 30 to 80 mass %. When the gel fraction falls within such a range, the impact resistance, the flexibility, and the cushioning properties are improved. From the aforementioned viewpoint, the gel fraction is more preferably 35 to 75 mass %, further preferably 40 to 73 mass %.

The gel fraction is a value measured by the method described in Examples.

The multilayer foam sheet of the present invention (first invention) has a resin layer and a foam layer, as described above.

The resin for forming each of the resin layer and the foam layer preferably contains a polyolefin resin. Use of a polyolefin resin makes it easy to ensure the impact resistance and the flexibility while improving the foaming property and the like.

<Polyolefin Resin>

A polyolefin resin is a thermoplastic resin, and specific examples thereof include polyethylene resins, polypropylene resins (PP), polybutene resins, and ethylene-vinyl acetate copolymers. Among these, polyethylene resins are preferable.

Examples of the polyethylene resins include high-density polyethylenes (HDPE), low-density polyethylenes (LDPE), and linear low-density polyethylenes (LLDPE). Further, examples of the polyethylene resins include polyethylene resins polymerized with polymerization catalysts such as Ziegler-Natta catalysts, metallocene catalysts, and chromium oxide compounds.

The linear low-density polyethylenes are more preferably linear low-density polyethylenes obtained by copolymerizing ethylene (e.g., 75 mass % or more, preferably 90 mass % or more, with respect to the total amount of monomers) with a small amount of an α-olefin, as required. Examples of the α-olefin specifically include propylene, 1-butene, 1-pentene, 4-methyl-1-pentene, 1-hexene, 1-heptene, and 1-octene. Among these, α-olefins having 4 to 10 carbon atoms are preferable.

The density of such a polyethylene resin, e.g., the density of the linear low-density polyethylene, is preferably 0.870 to 0.925 g/cm$^3$, more preferably 0.890 to 0.925 g/cm$^3$, further preferably 0.910 to 0.925 g/cm$^3$, in view of the flexibility. A plurality of polyethylene resins can be used as polyethylene resins, and a polyethylene resin having a density other than the aforementioned density range may be added.

Examples of the ethylene-vinyl acetate copolymers to be used as polyolefin resins include ethylene-vinyl acetate copolymers containing 50 mass % or more of ethylene.

Further, examples of the polypropylene resins include homopolypropylene, random polypropylene, and propylene-α-olefin copolymers containing 50 mass % or more of propylene. One of these may be used alone, or two or more thereof may be used in combination. Examples of α-olefins constituting a propylene-α-olefin copolymer can specifically include ethylene, 1-butene, 1-pentene, 4-methyl-1-pentene, 1-hexene, 1-heptene, and 1-octene. Among these, α-olefins having 6 to 12 carbon atoms are preferable. The copolymer may be a random copolymer or block copolymer.

Examples of the polybutene resins can include butene-1 homopolymers and copolymers with ethylene or propylene.

<Resin Layer>

The resin layer is a non-foam layer. Further, the resin layer may consist of polyolefin resins. The resin to be used for the resin layer is not specifically limited, and the aforementioned polyolefin resins can be suitably used. Specifically, examples thereof suitably include high-density polyethylenes (HDPE), polypropylene resins (PP), low-density polyethylenes (LDPE), and linear low-density polyethylenes (LLDPE). Such a polypropylene resin (PP) is preferably a random polypropylene. In the present invention (first invention), LLDPE and LDPE are preferable, LLDPE is more preferable, and a polyethylene resin polymerized with a metallocene catalyst (m-LLDPE) is further preferable, in view of achieving both impact resistance and flexibility.

The resin to be used for the resin layer may contain a known additive.

<Foam Layer>

As the resin to be used for the foam layer, low-density polyethylenes (LDPE) and linear low-density polyethylenes (LLDPE) are preferable, further linear low-density polyethylenes (LLDPE) are more preferable, and polyethylene resins polymerized with metallocene catalysts are particularly preferable, among the aforementioned polyolefin resins, in view of the flexibility.

Further, the foam resin composition for forming foam layers may contain a thermoplastic elastomer or olefin rubber together with the polyolefin resin. Hereinafter, the composition containing the polyolefin resin and a thermoplastic elastomer or olefin rubber will be referred to as "resin composition".

The resin composition constituting the foam layer may contain a polyolefin resin as a main component in order to maintain good handleability. Of the resin components contained in each layer, the polyolefin resin contained is, for example, 50 mass % or more, preferably 70 mass % or more, more preferably 90 mass % or more, most preferably 100 mass %. Meanwhile, a thermoplastic elastomer or olefin rubber needs only to be contained as a main component, for further improving the tumbling performance. Of the resin components contained in each layer, the thermoplastic elastomer or the olefin rubber contained is, for example, 50 mass % or more, preferably 70 mass % or more, more preferably 90 mass % or more, most preferably 100 mass %.

(Metallocene Catalyst)

Examples of the metallocene catalysts can include compounds such as a bis(cyclopentadienyl) metal complex having a structure in which a transition metal is sandwiched between π electron unsaturated compounds. More specifically, examples thereof can include compounds in which one or more cyclopentadienyl rings or analogues thereof are present as ligands to tetravalent transition metals such as titanium, zirconium, nickel, palladium, hafnium, and platinum.

Such metallocene catalysts have uniform properties of active sites and each active site has the same activity. Since polymers synthesized using metallocene catalysts have high uniformity in molecular weight, molecular weight distribution, composition, composition distribution, and the like, crosslinking uniformly proceeds, in the case of crosslinking a sheet containing a polymer synthesized using a metallocene catalyst. A uniformly crosslinked sheet is uniformly foamed, so that it is easy to stabilize physical properties. Further, since the foam can be uniformly stretched, the thickness thereof can be uniform.

Examples of the ligands can include cyclopentadienyl rings and indenyl rings. These cyclic compounds may be substituted with hydrocarbon groups, substituted hydrocarbon groups, or hydrocarbon-substituted metalloid groups. Examples of the hydrocarbon groups include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. The "various" means various isomers including n-, sec-, tert-, and iso-.

Further, a cyclic compound polymerized as an oligomer may be used as a ligand.

Further, in addition to π electron unsaturated compounds, monovalent anioic ligands such as chlorine and bromine or divalent anionic chelate ligands, hydrocarbons, alkoxides, arylamides, aryloxides, amides, phosphides, arylphosphides and the like may be used.

Examples of metallocene catalysts containing tetravalent transition metals and ligands include cyclopentadienyl titanium tris (dimethylamide), methyl cyclopentadienyl titanium tris(dimethylamide), bis(cyclopentadienyl) titanium dichloride, and dimethylsilyltetramethylcyclopentadienyl-t-butylamide zirconium dichloride.

Such a metallocene catalyst exerts its action as a catalyst in combination with a specific co-catalyst (promoter) in polymerization of various olefins. Specific examples of the co-catalyst include methylaluminoxane (MAO) and boron compounds. The ratio of the co-catalyst to be used to the metallocene catalyst is preferably 10 to 1000000 mol times, more preferably 50 to 5,000 mol times.

<Thermoplastic Elastomer>

Examples of the thermoplastic elastomer include olefin thermoplastic elastomers, styrene thermoplastic elastomers, vinyl chloride thermoplastic elastomers, polyurethane thermoplastic elastomers, polyester thermoplastic elastomers, and polyamide thermoplastic elastomers. As the thermoplastic elastomer, one of these components may be used alone, or two or more thereof may be used in combination.

Among these thermoplastic elastomers, olefin thermoplastic elastomers and styrene thermoplastic elastomers are preferable. Among them, those having a loss tangent (tan δ) peak value in the range of −40° C. to 10° C. are preferable.

(Olefin Thermoplastic Elastomer)

Olefin thermoplastic elastomers generally have polyolefins such as polyethylene and polypropylene as hard segments and rubber components such as butyl rubber, halobutyl rubber, EPDM (ethylene-propylene-diene rubber), EPM (ethylene-propylene rubber), NBR (acrylonitrile-butadiene rubber), and natural rubber as soft segments. As olefin thermoplastic elastomers, any of blend type, dynamic cross-linking type, and polymerization type can be used.

Suitable specific examples of the rubber components include EPM and EPDM mentioned above, and EPDM is particularly preferable. Examples of EPDM include ethylene-propylene-5-ethylidene-2-norbornene copolymer rubber and ethylene-propylene-dicyclopentadiene copolymer rubber. Among these, ethylene-propylene-dicyclopentadiene copolymer rubber is preferable.

Further, a block copolymer type is also mentioned as an olefin thermoplastic elastomer. Examples of the block copolymer type include those having a crystalline block and a soft segment block, more specifically crystalline olefin block-ethylene-butylene copolymer-crystalline olefin block copolymer (CEBC).

(Styrene Thermoplastic Elastomer)

Examples of the styrene thermoplastic elastomers include a block copolymer having a styrene polymer or copolymer block and a conjugated diene compound polymer or copolymer block. Examples of the conjugated diene compound include isoprene and butadiene. Further, such a styrene thermoplastic elastomer may be hydrogenated.

The styrene thermoplastic elastomers are generally block copolymers, and examples thereof include styrene-isoprene block copolymers (SI), styrene-isoprene-styrene block copolymers (SIS), styrene-butadiene block copolymers (SB), styrene-butadiene-styrene block copolymers (SBS), styrene-ethylene/butylene-styrene block copolymers (SEBS), styrene-ethylene/propylene-styrene block copolymers (SEPS), styrene-ethylene/ethylene/propylene-styrene block copolymers (SEEPS), styrene-ethylene/butylene block copolymers (SEB), styrene-ethylene/propylene block copolymers (SEP), and styrene-ethylene/butylene-crystalline olefin block copolymers (SEBC).

<Olefin Rubber>

The olefin rubber is an amorphous or low-crystalline rubber material in which two or more olefin monomers are substantially copolymerized at random, preferably ethylene-α-olefin copolymer rubber.

Examples of the α-olefin to be used for the ethylene-α-olefin copolymer rubber include one or more olefins having about 3 to 10 carbon atoms such as propylene, 1-butene, 2-methylpropylene, 3-methyl-1-butene, and 1-hexene. Among these, propylene is preferable.

Further, olefin rubber may contain repeating units composed of monomers other than olefins. Examples of the monomers include diene compounds typified by non-conjugated diene compounds having about 5 to 15 carbon atoms such as ethylidene norbornene, 1,4-hexadiene, and dicyclopentadiene.

The olefin rubber may be used alone or in combination of two or more.

Specific examples of preferable olefin rubbers include ethylene-propylene rubber (EPM) and ethylene-propylene-diene rubber (EPDM). Among them, EPDM is more preferable.

(Additive)

The foam layer according to the present invention (first invention) is preferably obtained by foaming a foamable resin composition containing the resin and the foaming agent described above. The foaming agent is preferably a thermally decomposable foaming agent.

Examples of the thermally decomposable foaming agent that can be used include organic foaming agents and inorganic foaming agents. Examples of the organic foaming agents include azo compounds such as azodicarbonamide, azodicarbon acid metal salts (such as barium azodicarboxylate), and azobisisobutyronitrile, nitroso compounds such as N,N'-dinitrosopentamethylenetetramine, hydrazine derivatives such as hydrazodicarbonamide, 4,4'-oxybis(benzenesulfonylhydrazide), and toluenesulfonylhydrazide, and semicarbazide compounds such as toluenesulfonylsemicarbazide.

Examples of the inorganic foaming agents include ammonium carbonate, sodium carbonate, ammonium bicarbonate, sodium bicarbonate, ammonium nitrite, sodium borohydride, and anhydrous monosodium citrate.

Among these, azo compounds are preferable, and azodicarbonamide is more preferable, in view of obtaining fine cells and in view of the economy and the safety.

One of the thermally decomposable foaming agent may be used alone, or two or more of them may be used in combination.

The content of the foaming agent in the foamable resin composition is preferably 1 part by mass or more and 20 parts by mass or less, more preferably 1.5 parts by mass or more and 15 parts by mass or less, further preferably 3 parts by mass or more and 10 parts by mass or less, with respect to 100 parts by mass of the resin. The content of the foaming agent of 1 part by mass or more enables the foam layer to be appropriately foamed and the multilayer foam sheet to have appropriate flexibility and cushioning properties in addition to the waterproofness. Further, the content of the foaming agent of 20 parts by mass or less prevents foaming of the foam layer more than necessary to improve the mechanical strength or the like of the multilayer foam sheet.

The foamable resin composition may contain a decomposition temperature regulator. The decomposition temperature regulator is contained for a regulating function such as lowering the decomposition temperature of the thermally decomposable foaming agent and accelerating the degradation rate. Specific examples of compounds include zinc oxide, zinc stearate, and urea. The decomposition temperature regulator is contained, for example, in an amount of 0.01 to 5 parts by mass with respect to 100 parts by mass of the resin, for adjusting the surface state or the like of the multilayer foam sheet (foam layer).

The foamable resin composition may contain an antioxidant. Examples of the antioxidant include phenolic antioxidants such as 2,6-di-t-butyl-p-cresol, sulfur antioxidants, phosphorus antioxidants, and amine antioxidants. Such an antioxidant is contained, for example, in an amount of 0.01 to 5 parts by mass with respect to 100 parts by mass of the resin.

The foamable resin composition may contain additives that are generally used for foams such as heat stabilizers, colorants, fire retardants, antistatic agents, and fillers other than the above.

In the foam layer, the content of the polyolefin resin is, for example, 70 mass % or more, preferably 80 mass % or more, more preferably 90 mass % or more, based on the total amount of the foam layer.

[Method for Producing Multilayer Foam Sheet]

The method for producing the multilayer foam sheet of the present invention (first invention) is not limited. For example, it can be produced by providing resin compositions for forming a resin layer and foam layers, and forming a stack of a resin layer and foamable resin layers by multilayer co-extrusion such as three-layer co-extrusion, followed by foaming.

Alternatively, a method of extrusion molding of each of a resin composition for forming a resin layer and a resin composition for forming foam layers to form a resin layer and foamable resin layers in advance and laminating them, followed by foaming can also be employed.

In addition, a method of foaming a foamable resin layer in advance to form a foam and laminating it with a resin layer can also be used.

More specifically, the method for producing the multilayer foam sheet is preferably multilayer co-extrusion including steps (1) to (4) below. Here, a method for producing a multilayer foam resin sheet having a three-layer structure is mentioned as an example, but there is no limitation to this example.

Step (1): The first, second, and third extruders are provided. A step of supplying components for forming foam layers containing at least a resin and a thermally decomposable foaming agent to the first and second extruders for melt-kneading and supplying components containing a resin for forming a resin layer and an additive as required to the third extruder for melt-kneading is followed.

Step (2): It is a step of obtaining a multilayer resin sheet in which a resin layer as a middle layer is provided and foamable resin layers are stacked on each of both outer surfaces of the middle layer by co-extrusion from the first, second, and third extruders. The temperature during extrusion is preferably 50° C. or more and 250° C. or less, more preferably 80° C. or more and 180° C. or less.

Step (3): It is a step of crosslinking by irradiation from both sides of the multilayer resin sheet with ionizing radiation. As ionizing radiation, electron beams, a rays, B rays, y rays, and the like can be used, and the amount of the ionizing radiation to be irradiated needs only to be adjusted so that the crosslinking ratio of the foam sheet to be obtained falls within a desired range. Specifically, it is preferably 1 to 12 Mrad, more preferably 1.5 to 9 Mrad.

Step (4): It is a step of heating the crosslinked multilayer resin sheet and foaming the thermally decomposable foaming agent to obtain a multilayer foam sheet. The heating temperature needs only to be the foaming temperature of the thermally decomposable foaming agent or more but is preferably 200 to 300° C., more preferably 220 to 280° C. In this step, the foamable resin composition is foamed, and cells are formed, to form a foam.

Further, in this production method, the multilayer foam sheet may be thinned by a method such as rolling or stretching.

The production method is not limited to the aforementioned steps, and a foam sheet may be obtained by a method other than the above. For example, crosslinking may be performed by a method including adding an organic peroxide into the foamable resin composition in advance and heating the multilayer resin sheet to decompose the organic peroxide, instead of irradiation with ionizing radiation.

Further, in the case where crosslinking is not necessary, step (3) may be omitted. In such a case, the uncrosslinked multilayer resin sheet may be heated to be foamed in step (4).

[Applications of Multilayer Foam Resin Sheet]

Applications of the multilayer foam resin sheet of the present invention (first invention) are not specifically limited, but use as a pressure-sensitive adhesive tape for fixing panels of electronic devices is preferable, because of its high impact resistance. Examples of the electronic devices include mobile phones such as smartphones, game devices, electronic notebooks, tablet terminals, mobile electronic devices such as notebook personal computers, and stationary electronic devices such as televisions.

[Pressure-Sensitive Adhesive Tape]

The pressure-sensitive adhesive tape includes, for example, a multilayer foam resin sheet and a pressure-sensitive adhesive material provided on at least any one surface of the multilayer foam resin sheet. The pressure-sensitive adhesive tape can adhere to another member such as a support member via the pressure-sensitive adhesive material. The pressure-sensitive adhesive tape may be a multilayer resin sheet provided with a pressure sensitive adhesive material on each of both sides or one side thereof.

Further, the pressure-sensitive adhesive material needs only to be provided with at least a pressure sensitive adhesive layer, and the pressure-sensitive adhesive layer alone may be stacked on the surface of the multilayer foam resin sheet, or a pressure-sensitive adhesive double-coated sheet may be attached onto the surface of the multilayer foam resin sheet. However, it is preferably a pressure-sensitive adhesive layer alone. The pressure-sensitive adhesive double-coated sheet includes a base material and a pressure-sensitive adhesive layer provided on each of both sides of the base material. The pressure-sensitive adhesive double-coated sheet is used for attaching one adhesive layer to the multilayer foam resin sheet and attaching the other pressure-sensitive adhesive layer to another member.

The pressure-sensitive adhesive constituting the pressure-sensitive adhesive layer is not particularly limited, and examples thereof that can be used include acrylic pressure-sensitive adhesives, urethane pressure-sensitive adhesives, rubber pressure-sensitive adhesives, and silicone pressure-sensitive adhesives. Further, a release sheet such as mold release paper may be further bonded onto the pressure-sensitive adhesive material.

The thickness of the pressure-sensitive adhesive material is preferably 5 to 200 μm, more preferably 7 to 150 μm, further preferably 10 to 100 μm.

The multilayer foam sheet may be used in any shape, for example a shape with narrow width, including narrow and elongated rectangular shapes, frame (picture frame-like) shapes such as square frames, L shapes, and U shapes. The width of such shapes is, for example, 5 mm or less, preferably 3 mm or less, more preferably 1 mm or less, and is 0.1 mm or more, for example. The multilayer foam sheet of the present invention (first invention) has good waterproofness even if it has a narrow width.

[Multilayer Foam Sheet] (Second Invention)

The multilayer foam sheet of the present invention (second invention) has a resin layer and a foam layer provided on at least one surface of the resin layer, wherein the tension value upon stretching by 1% is 0.50 N/10 mm or more, and the 25% compressive strength is 1000 kPa or less.

The multilayer foam sheet of the present invention (second invention) may have a foam layer on one surface of the resin layer, and the flexible foam layer exerts the waterproof performance. The present invention (second invention) preferably has a three-layer structure in which a foam layer is further provided on each of the front and back sides of the resin layer. In the case of a three-layer structure, the resin layer constitutes a middle layer, and the foam layer constitutes each outer layer. The outer layer means the outermost layer of the multilayer foam sheet, and the middle layer means an inner layer other than the outermost layer. The three-layer structure in which each outer layer is a foam layer further improves the waterproof performance. The configurations of the two outer layers on the front and back of the middle layer may be the same or different, but in view of ease of production, they preferably have the same configuration.

Further, even in the case of a two-layer structure, it is preferable to use the resin layer as a middle layer and the foam layer as an outer layer, so that the outer layer is in contact with the portion to be waterproofed. Furthermore, a multilayer having four or more layers may be employed, but it is preferable that the foam layer is used for the outermost layer, and the resin layer is used for a middle layer, as described above.

The foam layer (outer layer) may be directly stacked on the resin layer (middle layer) or may be stacked thereon via an intermediate layer such as an adhesive layer.

<Tension Value>

The multilayer foam sheet of the present invention (second invention) has a tension value upon stretching by 1% of 0.50 N/10 mm or more. When the tension value is less than 0.50 N/10 mm, problems arise in handling. In particular, when the tension value is less than 0.50 N/10 mm in the process of bonding a slip sheet to the multilayer foam sheet, where the slip sheet is laminated while applying tension, there is a problem that the slip sheet cannot be laminated satisfactorily, and the multilayer foam sheet with the slip sheet is warped, even when the sheet is transported at a comparatively low tension of 50 N/m in the field of web handling.

From the above viewpoint, the tension value is preferably 0.70 N/10 mm or more, more preferably 1.0 N/10 mm or more.

The 1% stretching direction is generally the machine direction (MD), but in the case where the MD direction is unknown, the direction with the highest tension value is taken as the MD direction.

<Compressive Strength>

The multilayer foam sheet of the present invention (second invention) has a 25% compressive strength of 1000 kPa or less. When the 25% compressive strength is over 1000 kPa, flexibility (followability) cannot be obtained, and good waterproofness cannot be obtained. From the aforementioned viewpoint, the 25% compressive strength is preferably 900 kPa or less, more preferably 800 kPa or less, further preferably 650 kPa or less.

The lower limit is not particularly limited but is generally about 10 kPa, preferably 20 kPa or more.

The 25% compressive strength is a value measured at a measurement temperature of 23° C. by a measurement method according to JIS K 6767.

<Thickness>

(Thickness of Resin Layer)

In the multilayer foam sheet of the present invention (second invention), the thickness of the resin layer as a middle layer is preferably 5 μm or more. When the thickness of the resin layer is 5 μm or more, a sufficient tension value can be obtained, a multilayer foam sheet with excellent handleability is obtained. From the aforementioned viewpoint, the thickness of the resin layer is more preferably 8 μm or more, further preferably 10 μm or more. Meanwhile, in view of the flexibility, it is preferably 200 μm or less, more preferably 150 μm or less, further preferably 120 μm or less, furthermore preferably 100 μm or less.

(Thickness of Foam Layer)

The thickness of each foam layer is preferably in the range of 10 to 995 μm, more preferably in the range of 30 to 700 μm, further preferably in the range of 50 to 500 μm, further preferably 50 to 195 μm. When the thickness is such a lower limit or more, a sufficient waterproofness can be exerted, and when it is the aforementioned upper limit or less, the total thickness of the multilayer foam sheet can be reduced, so that the multilayer foam sheet can be suitably used for thin electronic devices such as smartphones and tablets.

(Total Thickness)

The thickness of the multilayer foam sheet of the present invention (second invention) (which will be hereinafter referred to as "total thickness") is preferably in the range of 50 to 1000 μm. When the total thickness is 50 μm or more, an excellent waterproofness is obtained, and good cushioning properties as a foam sheet can be obtained. Further, when the total thickness is 1000 μm or less, the thickness can be reduced, so that the multilayer foam sheet can be suitably used for thin electronic devices such as smartphones and tablets and further the flexibility thereof can be easily ensured.

From these viewpoints, the total thickness of the multilayer foam sheet is more preferably 70 to 900 μm, further preferably 100 to 850 μm, more preferably 100 to 400 μm.

The thickness can be measured by a dial gauge.

(Ratio of Thicknesses of Outer Layer to Middle Layer)

The thickness of each of the outer layer (foam layer) and the middle layer (resin layer) is as described above, and the ratio of thicknesses of the outer layer to the middle layer (outer layer/middle layer) is preferably in the range of 1 to 50, more preferably in the range of 1.5 to 40, further preferably in the range of 1.8 to 30. When the ratio of thicknesses is such a lower limit or more, an excellent waterproofness is obtained, and when it is the aforementioned upper limit or less, a good handleability is obtained.

<Closed Cell Ratio>

In the multilayer foam sheet of the present invention (second invention), the closed cell ratio is preferably 80% or more. When the closed cell ratio is 80% or more, an excellent waterproofness can be secured. From the aforementioned viewpoint, the closed cell ratio of the foam sheet is further preferably 90% or more. The higher the closed cell ratio, it is more preferable, and it needs only to be 100% or less. Further, not only the waterproofness but also the cushioning properties are improved, and the original elasticity of the multilayer foam sheet can be easily maintained even after heating or cooling. There is also an advantage that the rate of change in compressive strength and the like tends to be low.

The closed cell ratio is measured by the method described in Examples.

<Average Cell Diameter>

The multilayer foam sheet of the present invention (second invention) preferably has an average cell diameter of 20 to 350 μm. When the average cell diameter falls within the aforementioned range, good cushioning properties are obtained, and a good surface smoothness of the multilayer foam sheet is obtained, so that it is not difficult to mount the housing of the device.

From the aforementioned viewpoint, the average cell diameter is more preferably 20 to 320 μm, further preferably 30 to 300 μm.

The average cell diameter in the present invention (second invention) is the larger value of the average cell diameters in the machine direction (MD) and in the direction perpendicular to the MD (TD: Transverse Direction).

Further, the average cell diameter is measured by the method described in Examples.

<Apparent Density>

The apparent density of the foam layer according to the present invention (second invention) is preferably 0.05 g/cm$^3$ to 0.75 g/cm$^3$, more preferably 0.08 g/cm$^3$ to 0.70 g/cm$^3$, further preferably 0.12 g/cm$^3$ to 0.60 g/cm$^3$.

When the apparent density falls within the aforementioned range, the waterproofness, flexibility, cushioning properties, and the like of the multilayer foam sheet are easily improved. Further, it becomes easier to impart a certain mechanical strength to the foam sheet and to improve the impact resistance and the like. The apparent density is a value measured according to JIS K 7222 (2005).

<Crosslinking Ratio (Gel Fraction)>

The multilayer foam sheet of the present invention (second invention) is preferably crosslinked, and the crosslinking ratio represented by the gel fraction is preferably 30 mass % or more. The flexibility and cushioning properties of the multilayer foam sheet in addition to the waterproofness are easily improved. From the aforementioned viewpoint, the gel fraction is more preferably 30 to 80 mass %, further preferably 35 to 70 mass %.

The gel fraction is a value measured by the method described in Examples.

The multilayer foam sheet of the present invention (second invention) has a resin layer and a foam layer, as described above.

The resins for forming a resin layer and foam layers each preferably contain a polyolefin resin. Use of a polyolefin resin makes it easy to ensure the flexibility and the waterproofness while improving the foaming property and the like.

<Polyolefin Resin>

The polyolefin resins to be used in the present invention (second invention) are the same as those described in the first invention above.

<Resin Layer>

The resin layer is a non-foam layer. Further, the resin layer may consist of a polyolefin resin. The resin to be used for the resin layer is not specifically limited, and the aforementioned polyolefin resins can be suitably used. Specifically, examples thereof suitably include high-density polyethylenes (HDPE), polypropylene resins (PP), low-density polyethylenes (LDPE), and linear low-density polyethylenes (LLDPE). In view of the tension value, as described above, the high-density polyethylenes (HDPE) are preferable.

The resin to be used for the resin layer may contain a known additive.

<Foam Layer>

As the resin to be used for the foam layer, low density polyethylenes (LDPE) and linear low-density polyethylenes (LLDPE) are preferable, further linear low-density polyethylenes (LLDPE) are more preferable, and polyethylene resins polymerized with metallocene catalysts are particularly preferable, among the aforementioned polyolefin resins, in view of the waterproofness.

Further, the foam resin composition for forming foam layers may contain a thermoplastic elastomer or olefin rubber together with the polyolefin resin.

The foam layer may contain a polyolefin resin as a main component. Of the resin components contained in each layer, the polyolefin resin contained is, for example, 50 mass % or more, preferably 70 mass % or more, more preferably 90 mass % or more, most preferably 100 mass %. Here, the resin component also includes a thermoplastic elastomer and a rubber component.

(Metallocene Catalyst)

The metallocene catalysts to be used in the present invention (second invention) are the same as those described in the first invention above.

<Thermoplastic Elastomer>

Examples of the thermoplastic elastomer include olefin thermoplastic elastomers, styrene thermoplastic elastomers, vinyl chloride thermoplastic elastomers, polyurethane thermoplastic elastomers, polyester thermoplastic elastomers, and polyamide thermoplastic elastomers. As the thermoplastic elastomer, one of these components may be used alone, or two or more thereof may be used in combination.

Among these thermoplastic elastomers, olefin thermoplastic elastomers and styrene thermoplastic elastomers are preferable.

(Olefin Thermoplastic Elastomer)

Olefin thermoplastic elastomers generally have polyolefins such as polyethylene and polypropylene as hard segments and rubber components such as butyl rubber, halobutyl rubber, EPDM (ethylene-propylene-diene rubber), EPM (ethylene-propylene rubber), NBR (acrylonitrile-butadiene rubber), and natural rubber as soft segments. As olefin thermoplastic elastomers, any of blend type, dynamic crosslinking type, and polymerization type can be used.

Suitable specific examples of the rubber components include EPM and EPDM mentioned above, and EPDM is particularly preferable. Examples of EPDM include ethylene-propylene-5-ethylidene-2-norbornene copolymer rubber and ethylene-propylene-dicyclopentadiene copolymer rubber. Among these, ethylene-propylene-dicyclopentadiene copolymer rubber is preferable.

Further, a block copolymer type is also mentioned as an olefin thermoplastic elastomer. Examples of the block copolymer type include those having a crystalline block and a soft segment block, more specifically, crystalline olefin block-ethylene-butylene copolymer-crystalline olefin block copolymer (CEBC).

(Styrene Thermoplastic Elastomer)

Examples of the styrene thermoplastic elastomers include a block copolymer having a styrene polymer or copolymer block and a conjugated diene compound polymer or copolymer block. Examples of the conjugated diene compound include isoprene and butadiene. Further, such a styrene thermoplastic elastomer may be hydrogenated.

The styrene thermoplastic elastomers are generally block copolymers, and examples thereof include styrene-isoprene block copolymers (SI), styrene-isoprene-styrene block copolymers (SIS), styrene-butadiene block copolymers (SB), styrene-butadiene-styrene block copolymers (SBS), styrene-ethylene/butylene-styrene block copolymers (SEBS), styrene-ethylene/propylene-styrene block copolymers (SEPS), styrene-ethylene/ethylene/propylene-styrene block copolymers (SEEPS), styrene-ethylene/butylene block copolymers (SEB), styrene-ethylene/propylene block copolymers (SEP), and styrene-ethylene/butylene-crystalline olefin block copolymers (SEBC).

<Olefin Rubber>

The olefin rubber is an amorphous or low-crystalline rubber material in which two or more olefin monomers are substantially copolymerized at random, preferably ethylene-α-olefin copolymer rubber.

Examples of the α-olefin to be used for the ethylene-α-olefin copolymer rubber include one or more olefins having about 3 to 10 carbon atoms such as propylene, 1-butene, 2-methylpropylene, 3-methyl-1-butene, and 1-hexene. Among these, propylene is preferable.

Further, olefin rubber may contain repeating units composed of monomers other than olefins. Examples of the monomers include diene compounds typified by non-conjugated diene compounds having about 5 to 15 carbon atoms such as ethylidene norbornene, 1,4-hexadiene, and dicyclopentadiene.

The olefin rubber may be used alone or in combination of two or more.

Specific examples of preferable olefin rubbers include ethylene-propylene rubber (EPM) and ethylene-propylene-diene rubber (EPDM). Among them, EPDM is more preferable.

(Additive)

The foam layer according to the present invention (second invention) is preferably obtained by foaming a foamable resin composition containing the resin and the foaming agent described above. The foaming agents are the same as those described in the first invention above. Further, other additives are also the same as those described in the first invention above.

[Method for Producing Multilayer Foam Sheet]

The method for producing the multilayer foam sheet of the present invention (second invention) is not limited. For example, it can be produced by providing resin compositions for forming a resin layer and foam layers, and forming a stack of a resin layer and a foamable resin layer by multilayer co-extrusion such as double-layer co-extrusion and three-layer co-extrusion, followed by foaming.

Alternatively, a method of extrusion molding of each of a resin composition for forming a resin layer and a resin composition for forming foam layers to form a resin layer and a foamable resin layer in advance and laminating them, followed by foaming can also be employed.

In addition, a method of foaming a foamable resin layer in advance to form a foam and laminating it with a resin layer can also be used.

More specifically, the method for producing the multilayer foam sheet is preferably multilayer co-extrusion including steps (1) to (4) below. Here, a method for producing a multilayer foam resin sheet having a three-layer structure is mentioned as an example, but there is no limitation to this example.

Step (1): The first, second, and third extruders are provided. A step of supplying components for forming foam layers containing at least a resin and a thermally decomposable foaming agent to the first and second extruders for melt-kneading and supplying components containing a resin for forming a resin layer and an additive as required to the third extruder for melt-kneading is followed.

Step (2): It is a step of obtaining a multilayer resin sheet in which a resin layer as a middle layer is provided and a foamable resin layer is stacked on each of both outer surfaces of the middle layer by co-extrusion of a foamable resin composition for forming foam layers and a resin for forming a resin layer or a resin composition from the first, second, and third extruders. The temperature during extrusion is preferably 50° C. or more and 250° C. or less, more preferably 80° C. or more and 180° C. or less.

Step (3): It is a step of crosslinking by irradiation from both sides of the multilayer resin sheet with ionizing radiation. As ionizing radiation, electron beams, a rays, B rays, Y rays, and the like can be used, and the amount of the ionizing radiation to be irradiated needs only to be adjusted so that the crosslinking ratio of the foam sheet to be obtained falls within a desired range. Specifically, it is preferably 1 to 12 Mrad, more preferably 1.5 to 8 Mrad.

Step (4): It is a step of heating the crosslinked multilayer resin sheet and foaming the thermally decomposable foaming agent to obtain a multilayer foam sheet. The heating temperature needs only to be the foaming temperature of the thermally decomposable foaming agent or more but is preferably 200 to 300° C., more preferably 220 to 280° C. In this step, the foamable resin composition is foamed, and cells are formed, to form a foam.

Further, in this production method, the multilayer foam sheet may be thinned by a method such as rolling or stretching.

The production method is not limited to the aforementioned steps, and a foam sheet may be obtained by a method other than the above. For example, crosslinking may be performed by a method including adding an organic peroxide into the foamable resin composition in advance and heating the multilayer resin sheet to decompose the organic peroxide, instead of irradiation with ionizing radiation.

Further, in the case where crosslinking is not necessary, step (3) may be omitted. In such a case, the uncrosslinked multilayer resin sheet may be heated to be foamed in step (4).

The multilayer foam sheet obtained may be appropriately processed while being transported by roll-to-roll with a tension applied in the MD direction. Examples of processing include bonding of slip sheets or the like, and pressure sensitive adhesive treatment such as application of a pressure-sensitive adhesive and bonding of a pressure-sensitive adhesive double coated tape.

[Applications of Multilayer Foam Resin Sheet]

Applications of the multilayer foam resin sheet of the present invention (second invention) are not specifically limited, but use as a pressure-sensitive adhesive tape for fixing panels of electronic devices is preferable, because of its high waterproofness. Examples of the electronic devices include mobile phones such as smartphones, game devices, electronic notebooks, tablet terminals, mobile electronic devices such as notebook personal computers, and stationary electronic devices such as televisions.

[Pressure-Sensitive Adhesive Tape]

The pressure-sensitive adhesive tape has, for example, a multilayer foam sheet and a pressure-sensitive adhesive material provided on at least any one surface of the multilayer foam sheet. The pressure-sensitive adhesive tape can adhere to another member such as a support member via the pressure-sensitive adhesive material. The pressure-sensitive adhesive tape may be a multilayer foam sheet provided with a pressure-sensitive adhesive material on each of both sides or one side thereof.

Further, the pressure-sensitive adhesive material needs only to be provided with at least a pressure-sensitive adhesive layer, and the pressure-sensitive adhesive layer alone may be stacked on the surface of the multilayer foam sheet, or a pressure-sensitive adhesive double-coated sheet may be attached onto the surface of the multilayer foam sheet. However, it is preferably a pressure-sensitive adhesive layer alone. The pressure-sensitive adhesive double-coated sheet has a base material and a pressure-sensitive adhesive layer provided on each of both sides of the base material. The pressure-sensitive adhesive double-coated sheet is used for attaching one adhesive layer to the multilayer foam sheet and attaching the other pressure-sensitive adhesive layer to another member.

The pressure-sensitive adhesive constituting the pressure-sensitive adhesive layer is not particularly limited, and examples thereof that can be used include acrylic pressure-sensitive adhesives, urethane pressure-sensitive adhesives, rubber pressure-sensitive adhesives, and silicone pressure-sensitive adhesives. Further, a release sheet such as mold release paper may be further bonded onto the pressure-sensitive adhesive material.

The thickness of the pressure-sensitive adhesive material is preferably 5 to 200 μm, more preferably 7 to 150 μm, further preferably 10 to 100 μm.

The multilayer foam sheet of the present invention (second invention) may be used in any shape, for example a shape with narrow width, including narrow and elongated rectangular shapes, frame (picture frame-like) shapes such as square frames, L shapes, and U shapes. The width of such shapes is, for example, 5 mm or less, preferably 3 mm or less, more preferably 1 mm or less, and is 0.1 mm or more, for example. The multilayer foam sheet of the present invention (second invention) has good waterproofness even if it has a narrow width.

[Multilayer Foam Sheet] (Third Invention)

The multilayer foam sheet of the present invention (third invention) has a foam layer on each of both sides of the resin layer, wherein the 25% compressive strength is 1000 kPa or less, and the ratio of the MD tensile strength at break to the TD tensile strength at break (which may hereinafter be referred to as "MD/TD ratio") is 1.40 or less.

The multilayer foam sheet of the present invention (third invention) has a structure in which a resin layer is provided as a middle layer, and a foam layer is stacked on each of the front and back sides thereof as an outer layer. Here, the outer layer means the outermost layer of the multilayer foam sheet, and the middle layer means an inner layer other than the outermost layer. With the three-layer structure in which each outer layer is a foam layer, the flexibility and the waterproofness can be ensured, and the impact resistance is excellent. Further, the resin layer provided as a middle layer can reduce the difference between the MD tensile strength at break and the TD tensile strength at break that can generally occur in an extruded product and can reduce the anisotropy, so that a sheet with excellent handleability can be obtained.

The configurations of the two outer layers on the front and back sides of the middle layer may be the same or different but are preferably the same for ease of production. The foam layer (outer layer) may be directly stacked on the resin layer (middle layer) or may be stacked thereon via an intermediate layer such as an adhesive layer. Further, a multilayer structure of 4 or more layers may be employed, as long as a resin layer as a middle layer and a foam layer as an outermost layer are provided.

<Compressive Strength>

The multilayer foam sheet of the present invention (third invention) has a 25% compressive strength of 1000 kPa or less. When the 25% compressive strength is over 1000 kPa, flexibility (followability) and cushioning properties cannot be obtained, and good waterproofness cannot be obtained. From the aforementioned viewpoint, the 25% compressive strength is preferably 900 kPa or less, more preferably 800 kPa or less, further preferably 650 kPa or less.

The lower limit is not particularly limited but is generally about 10 kPa, preferably 20 kPa or more.

The 25% compressive strength is a value measured at a measurement temperature of 23° C. by a measurement method according to JIS K 6767.

<Tensile Strength at Break>

In the multilayer foam sheet of the present invention (third invention), the ratio of the MD tensile strength at break to the TD tensile strength at break (MD/TD ratio) is 1.40 or less. When the ratio is over 1.40, the multilayer foam sheet has anisotropy and may become difficult to handle. Meanwhile, when the MD/TD ratio is 1.40 or less, there is no anisotropy in tensile strength at break, and the handleability is excellent. For example, when used as a pressure-sensitive adhesive tape, the multilayer foam sheet of the present invention (third invention) can be used without considering the difference due to the use direction. The ratio is preferably 1.35 or less, more preferably 1.25 or less. Further, the MD/TD ratio should be close to 1, with a lower limit of 1 but is generally greater than 1.

Further, the foam sheet of the present invention (third invention) preferably has a tensile strength at break in the MD direction at 23° C. of 15 N/10 mm or more. When the tensile strength at break is 15 N/10 mm or more, a good impact resistance is obtained. For example, in the case of using the multilayer foam sheet of the present invention (third invention) as a pressure-sensitive adhesive tape, there is little deformation or the like of the tape, and the reworkability is good. From the aforementioned viewpoint, the tensile strength at break is more preferably 20 N/10 mm or more, further preferably 25 N/10 mm or more.

The upper limit of the tensile strength at break is not specifically limited, as long as the ratio of the MD tensile strength at break to the TD tensile strength at break is 1.4 or less but is preferably 300 N/10 mm or less, more preferably 250 N/10 mm or less.

When the MD direction is unknown, the direction with the highest tensile breaking strength is taken as the MD direction. The tensile strength at break is a value measured by the method described in Examples.

<Thickness>
(Thickness of Resin Layer)

In the multilayer foam sheet of the present invention (third invention), the resin layer as a middle layer preferably has a thickness of 10 μm or more. When the thickness is 10 μm or more, a sufficient impact resistance is obtained. From the aforementioned viewpoint, the thickness of the resin layer is preferably 15 μm or more, more preferably 20 μm or more.

Further, the thickness of the resin layer is preferably 200 μm or less, more preferably 150 μm or less, further preferably 120 μm or less, furthermore preferably 100 μm or less. When the thickness is such an upper limit or less, the total thickness of the multilayer foam sheet (which will be hereinafter referred to as "total thickness") can be reduced, so that the multilayer foam sheet can be suitably used for thin electronic devices such as smartphones and tablets.

(Thickness of Foam Layer)

The thickness of the foam layer is preferably in the range of 10 to 1000 μm, more preferably in the range of 30 to 700 μm, further preferably in the range of 50 to 500 μm, furthermore preferably in the range of 50 to 295 μm. When the thickness is such a lower limit or more, a sufficient impact resistance and a sufficient flexibility can be exerted, and when it is the aforementioned upper limit or less, the total thickness of the multilayer foam sheet can be reduced, so that the multilayer foam sheet can be suitably used for thin electronic devices such as smartphones and tablets.

(Total Thickness)

The multilayer foam sheet of the present invention (third invention) preferably has a total thickness in the range of 30 to 2000 μm. When it has a total thickness of 30 μm or more, a sufficient flexibility as well as a sufficient impact resistance can be obtained, and when it has a total thickness of 2000 μm or less, the thickness can be reduced, so that the multilayer foam sheet can be suitably used for thin electronic devices such as smartphones and tablets.

From these viewpoints, the total thickness of the multilayer foam sheet is more preferably 70 to 1800 μm, further preferably 100 to 1500 μm, furthermore preferably 120 to 600 μm.

The thickness can be measured by a dial gauge.

(Ratio of Thicknesses of Outer Layer to Middle Layer)

The thickness of each outer layer (foam layer) and each middle layer (resin layer) is as described above, and the ratio of thicknesses of the outer layer to the middle layer (outer layer/middle layer) is preferably 5 or less. When the ratio is 5 or less, a sufficient impact resistance is obtained, and the MD/TD ratio of 1.40 or less is easily achieved. The lower limit is preferably 1 or more in consideration of the flexibility, the waterproofness, and the like. From the aforementioned viewpoint, the ratio of thicknesses of the outer layer to the middle layer is more preferably in the range of 0.5 to 5, further preferably in the range of 1 to 4.5.

<Overall Density>

The overall density refers to the apparent density of the entire multilayer foam sheet of the present invention (third invention) and is preferably 0.1 to 0.8 g/cm$^3$, more preferably 0.15 to 0.7 g/cm$^3$.

When the apparent density falls within the aforementioned range, the flexibility, the cushioning properties, the waterproofness, and the like of the multilayer foam sheet are easily improved. Further, it becomes easier to impart a certain mechanical strength to the multilayer foam sheet and to improve the impact resistance. The apparent density is a value measured according to JIS K 7222 (2005).

The apparent density of the foam layer is preferably 0.05 to 0.7 g/cm$^3$, more preferably 0.08 to 0.7 g/cm$^3$, more preferably 0.15 to 0.65 g/cm$^3$, further preferably in the range of 0.18 to 0.60 g/cm$^3$. When it falls within such a range, the overall density is easily regulated.

<Closed Cell Ratio>

In the multilayer foam sheet of the present invention (third invention), the closed cell ratio is preferably 90% or more. The closed cell ratio of 90% or more can secure the impact resistance. From the aforementioned viewpoint, the closed cell ratio of the foam sheet is further preferably 92% or more. The higher the closed cell ratio, it is more preferable, and it needs only to be 100% or less. Further, not only the impact resistance but also the cushioning properties are improved, and the original elasticity of the multilayer foam sheet can be easily maintained even after heating or cooling. There is also an advantage that the rate of change in compressive strength and the like tends to be low.

The closed cell ratio is measured by the method described in Examples.

<Average Cell Diameter>

The multilayer foam sheet of the present invention (third invention) preferably has an average cell diameter of 20 to 350 μm. When the average cell diameter falls within the aforementioned range, good cushioning properties are obtained, and a good surface smoothness of the multilayer foam sheet is obtained, so that it is not difficult to mount the housing of the device.

From the aforementioned viewpoint, the average cell diameter is more preferably 20 to 320 μm, further preferably 30 to 300 μm.

The average cell diameter in the present invention (third invention) is the larger value of the average cell diameters in the machine direction (MD) and in the direction perpendicular to the MD (TD: Transverse Direction).

Further, the average cell diameter is measured by the method described in Examples.

(Crosslinking Ratio (Gel Fraction))

The foam layer according to the present invention (third invention) is preferably crosslinked, and the crosslinking ratio represented by the gel fraction is preferably 30 mass % or more. The flexibility and cushioning properties of the multilayer foam sheet in addition to the waterproofness are easily improved. From the aforementioned viewpoint, the gel fraction is more preferably 30 to 80 mass %, further preferably 35 to 75 mass %.

The gel fraction is a value measured by the method described in Examples.

The multilayer foam sheet of the present invention (third invention) has a resin layer and a foam layer, as described above.

The resins for forming a resin layer and foam layers each preferably contain a polyolefin resin. Use of a polyolefin resin makes it easy to ensure the flexibility and the waterproofness while improving the foaming property and the like.

The multilayer foam sheet of the present invention (third invention) has MD anisotropy.

In general, when production of foam sheets includes a roll-to-roll process in the MD direction, a foam sheet has anisotropy in the MD direction such as high MD tensile strength and low TD tensile strength due to the influence of tension and resin orientation in the MD direction.

In this description, having MD anisotropy means not only an embodiment of being intentionally stretched in the MD to have MD anisotropy but also an embodiment of being substantially stretched in the MD by a tension acting in the MD due to extrusion process and sheet transport during production to have anisotropy.

The multilayer foam sheet of the present invention (third invention) into which a resin sheet as a middle layer that is less likely affected by anisotropy is introduced can eliminate the anisotropy that can generally occur. Accordingly, the foam layer of the present invention (third invention) has a higher MD tensile strength at break than the TD tensile strength at break, but the difference is small as compared with conventional foam layers, and the ratio of the MD tensile strength at break to the TD tensile strength at break (MD/TD ratio) is 1.40 or less.

<Polyolefin Resin>

The polyolefin resins to be used in the present invention (third invention) are the same as those described in the first invention above.

<Resin Layer>

The resin layer is a non-foam layer. Further, the resin layer may consist of a polyolefin resin. The resin to be used for the resin layer is not specifically limited, and the aforementioned polyolefin resins can be suitably used. Specifically, examples thereof suitably include high density polyethylenes (HDPE), polypropylene resins (PP), low-density polyethylenes (LDPE), and linear low-density polyethylenes (LLDPE). Such a polypropylene resin (PP) is preferably a random polypropylene. In the present invention (third invention), LLDPE and LDPE are preferable, LLDPE is more preferable, and a polyethylene resin polymerized with a metallocene catalyst (m-LLDPE) is further preferable, for achieving both impact resistance and flexibility.

Further, the resin for forming a resin layer may contain a thermoplastic elastomer or olefin rubber together with the polyolefin resin.

The resin to be used for the resin layer may contain a known additive.

<Foam Layer>

As the resin to be used for the foam layer, low-density polyethylenes (LDPE) and linear low-density polyethylenes (LLDPE) are preferable, further linear low-density polyethylenes (LLDPE) are more preferable, and polyethylene resins polymerized with metallocene catalysts are particularly preferable, among the aforementioned polyolefin resins, in view of the flexibility.

Further, the foam resin composition for forming foam layers may contain a thermoplastic elastomer or olefin rubber together with the polyolefin resin.

The foam layer may contain a polyolefin resin as a main component. Of the resin components contained in each layer, the polyolefin resin contained is, for example, 50 mass % or more, preferably 70 mass % or more, more preferably 90 mass % or more, most preferably 100 mass %. Here, the resin component also includes a thermoplastic elastomer and a rubber component.

(Metallocene Catalyst)

The metallocene catalysts to be used in the present invention (third invention) are the same as those described in the first invention above.

<Thermoplastic Elastomer>

Examples of the thermoplastic elastomer include olefin thermoplastic elastomers, styrene thermoplastic elastomers, vinyl chloride thermoplastic elastomers, polyurethane thermoplastic elastomers, polyester thermoplastic elastomers, and polyamide thermoplastic elastomers. As the thermoplastic elastomer, one of these components may be used alone, or two or more thereof may be used in combination.

Among these thermoplastic elastomers, olefin thermoplastic elastomers and styrene thermoplastic elastomers are preferable.

(Olefin Thermoplastic Elastomer)

Olefin thermoplastic elastomers generally have polyolefins such as polyethylene and polypropylene as hard segments and rubber components such as butyl rubber, halobutyl rubber, EPDM (ethylene-propylene-diene rubber), EPM (ethylene-propylene rubber), NBR (acrylonitrile-butadiene rubber), and natural rubber as soft segments. As olefin thermoplastic elastomers, any of blend type, dynamic cross-linking type, and polymerization type can be used.

Suitable specific examples of the rubber components include EPM and EPDM mentioned above, and EPDM is particularly preferable. Examples of EPDM include ethylene-propylene-5-ethylidene-2-norbornene copolymer rubber and ethylene-propylene-dicyclopentadiene copolymer rubber. Among these, ethylene-propylene-dicyclopentadiene copolymer rubber is preferable.

Further, a block copolymer type is also mentioned as an olefin thermoplastic elastomer. Examples of the block copolymer type include those having a crystalline block and a soft segment block, more specifically, crystalline olefin block-ethylene-butylene copolymer-crystalline olefin block copolymer (CEBC).

(Styrene Thermoplastic Elastomer)

Examples of the styrene thermoplastic elastomers include a block copolymer having a styrene polymer or copolymer block and a conjugated diene compound polymer or copolymer block. Examples of the conjugated diene compound include isoprene and butadiene. Further, such a styrene thermoplastic elastomer may be hydrogenated.

The styrene thermoplastic elastomers are generally block copolymers, and examples thereof include styrene-isoprene block copolymers (SI), styrene-isoprene-styrene block copolymers (SIS), styrene-butadiene block copolymers (SB), styrene-butadiene-styrene block copolymers (SBS), styrene-ethylene/butylene-styrene block copolymers (SEBS), styrene-ethylene/propylene-styrene block copolymers (SEPS), styrene-ethylene/ethylene/propylene-styrene block copolymers (SEEPS), styrene-ethylene/butylene block copolymers (SEB), styrene-ethylene/propylene block copolymers (SEP), and styrene-ethylene/butylene-crystalline olefin block copolymers (SEBC).

<Olefin Rubber>

The olefin rubber is an amorphous or low-crystalline rubber material in which two or more olefin monomers are substantially copolymerized at random, preferably ethylene-α-olefin copolymer rubber.

Examples of the α-olefin to be used for the ethylene-α-olefin copolymer rubber include one or more olefins having about 3 to 10 carbon atoms such as propylene, 1-butene, 2-methylpropylene, 3-methyl-1-butene, and 1-hexene. Among these, propylene is preferable.

Further, olefin rubber may contain repeating units composed of monomers other than olefins. Examples of the monomers include diene compounds typified by non-conjugated diene compounds having about 5 to 15 carbon atoms such as ethylidene norbornene, 1,4-hexadiene, and dicyclopentadiene.

The olefin rubber may be used alone or in combination of two or more.

Specific examples of preferable olefin rubbers include ethylene-propylene rubber (EPM) and ethylene-propylene-diene rubber (EPDM). Among them, EPDM is more preferable.

(Additive)

The foam layer according to the present invention (third invention) is preferably obtained by foaming a foamable resin composition containing the resin and the foaming agent described above. The foaming agents are the same as those described in the first invention above. Further, other additives are also the same as those described in the first invention above.

[Method for Producing Multilayer Foam Sheet]

The method for producing the multilayer foam sheet of the present invention (third invention) is not limited. For example, it can be produced by providing resin compositions for forming a resin layer and foam layers, and forming a stack of a resin layer and foamable resin layers by multilayer co-extrusion such as three-layer co-extrusion, followed by foaming.

Alternatively, a method of extrusion molding of each of a resin composition for forming a resin layer and a resin composition for forming foam layers to form a resin layer and foamable resin layers in advance and laminating them, followed by foaming can also be employed.

In addition, a method of foaming foamable resin layers in advance to form a foam and laminating it with a resin layer can also be used.

More specifically, the method for producing the multilayer foam sheet is preferably multilayer co-extrusion including steps (1) to (4) below. Here, a method for producing a multilayer foam resin sheet having a three-layer structure is mentioned as an example, but there is no limitation to this example.

Step (1): The first, second, and third extruders are provided. A step of supplying components for forming foam layers containing at least a resin and a thermally decomposable foaming agent to the first and second extruders for melt-kneading and supplying components containing a resin for forming a resin layer and an additive as required to the third extruder for melt-kneading is followed.

Step (2): It is a step of obtaining a multilayer resin sheet in which a resin layer as a middle layer is provided and foamable resin layers are stacked on each of both outer surfaces of the middle layer by co-extrusion from the first, second, and third extruders. The temperature during extrusion is preferably 50° C. or more and 250° C. or less, more preferably 80° C. or more and 180° C. or less.

Step (3): It is a step of crosslinking by irradiation from both sides of the multilayer resin sheet with ionizing radiation. As ionizing radiation, electron beams, α rays, β rays, γ rays, and the like can be used, and the amount of the ionizing radiation to be irradiated needs only to be adjusted so that the crosslinking ratio of the foam sheet to be obtained falls within a desired range. Specifically, it is preferably 1 to 12 Mrad, more preferably 1.5 to 8 Mrad.

Step (4): It is a step of heating the crosslinked multilayer resin sheet and foaming the thermally decomposable foaming agent to obtain a multilayer foam sheet. The heating temperature needs only to be the foaming temperature of the thermally decomposable foaming agent or more but is preferably 200 to 300° C., more preferably 220 to 280° C. In this step, the foamable resin composition is foamed, and cells are formed, to form a foam.

The multilayer resin sheet may be heated, for example, by passing through a heating furnace.

Further, the multilayer resin sheet obtained in step (2) may be irradiated with ionizing radiation and passed through a heating furnace in steps (3) and (4), while being transported by roll-to-roll or the like.

Further, in this production method, the multilayer foam sheet may be thinned by a method such as rolling or stretching.

The production method is not limited to the aforementioned steps, and a multilayer foam sheet may be obtained by a method other than the above. For example, crosslinking may be performed by a method including adding an organic peroxide into the foamable resin composition in advance and heating the multilayer resin sheet to decompose the organic peroxide, instead of irradiation with ionizing radiation.

Further, in the case where crosslinking is not necessary, step (4) may be omitted. In such a case, the uncrosslinked multilayer resin sheet may be heated to be foamed in step (5).

[Applications of Multilayer Foam Resin Sheet]

Applications of the multilayer foam resin sheet of the present invention (third invention) are not specifically limited, but use as a pressure-sensitive adhesive tape for fixing panels of electronic devices is preferable, because of its high waterproofness. Examples of the electronic devices include mobile phones such as smartphones, game devices, electronic notebooks, tablet terminals, mobile electronic devices such as notebook personal computers, and stationary electronic devices such as televisions.

[Pressure-Sensitive Adhesive Tape]

The pressure-sensitive adhesive tape has, for example, a multilayer foam resin sheet and a pressure-sensitive adhesive material provided on at least any one surface of the multilayer foam resin sheet. The pressure-sensitive adhesive tape can adhere to another member such as a support member via the pressure-sensitive adhesive material. The pressure-sensitive adhesive tape may be a multilayer resin sheet provided with a pressure-sensitive adhesive material on each of both sides or one side thereof.

Further, the pressure-sensitive adhesive material needs only to be provided with at least a pressure-sensitive adhesive layer, and the pressure-sensitive adhesive layer alone may be stacked on the surface of the multilayer foam resin sheet, or a pressure-sensitive adhesive double-coated sheet may be attached onto the surface of the multilayer foam resin sheet. However, it is preferably a pressure-sensitive adhesive layer alone. The pressure-sensitive adhesive double-coated sheet has a base material and a pressure-sensitive adhesive layer provided on each of both sides of the base material. The pressure-sensitive adhesive double-coated sheet is used for attaching one adhesive layer to the multilayer foam resin sheet and attaching the other pressure-sensitive adhesive layer to another member.

The pressure-sensitive adhesive constituting the pressure-sensitive adhesive layer is not particularly limited, and examples thereof that can be used include acrylic pressure-sensitive adhesives, urethane pressure-sensitive adhesives, rubber pressure-sensitive adhesives, and silicone pressure-sensitive adhesives. Further, a release sheet such as mold release paper may be further bonded onto the pressure-sensitive adhesive material.

The thickness of the pressure-sensitive adhesive material is preferably 5 to 200 μm, more preferably 7 to 150 μm, further preferably 10 to 100 μm.

The multilayer foam sheet may be used in any shape, for example a shape with narrow width, including narrow and elongated rectangular shapes, frame (picture frame-like) shapes such as square frames, L shapes, and U shapes. The width of such shapes is, for example, 5 mm or less, preferably 3 mm or less, more preferably 1 mm or less, and is 0.1 mm or more, for example. The multilayer foam sheet of the present invention (third invention) has good waterproofness even if it has a narrow width.

[Rolled Product]

The multilayer foam sheet of the present invention (third invention) is preferably produced by extrusion molding of a molten resin composition, as described above. For example, the melt-extruded sheet having a three-layer structure undergoes a crosslinking step, a foaming step, and the like, while being transported, and is then finally taken up into a rolled product. In such a production method, a tension is applied in the machine direction (MD direction) in each step. Accordingly, the multilayer foam sheet of the present invention (third invention) has anisotropy, and the rolled product of the present invention (third invention) is a roll of the multilayer foam sheet that is taken up while a tension is applied.

Even if the multilayer foam sheet of the present invention (third invention) is produced by such a production process in which a tension is applied, the multilayer foam sheet has a MD/TD of 1.40 or less, and thus it is easy to handle when it is used while unwound from the roll. Further, also when the multilayer foam sheet is bonded with slip sheets, slip sheets can be continuously bonded to the sheet unwound from the roll, and no warpage is observed in the stacked foam roll with slip sheets.

The rolled product of the multilayer foam sheet thus produced can be stored in roll form and can be shipped in roll form.

EXAMPLES

Hereinafter, the present invention will be described in more detail with reference to Examples; however, the present invention is not limited in any way by these Examples.

In addition, the measuring method of each physical property and the evaluation method of the foam sheet are as follows.

Examples According to First Invention
[Physical Properties after Molding]
(1) 25% Compressive Strength The 25% compressive strength of the multilayer foam sheet was measured at a measurement temperature of 23° C. by a method according to JIS K 7181.

(2) MD Tensile Strength at Break

The multilayer foam sheet produced in each of Examples and Comparative Examples was cut into a dumbbell-shaped No. 1 specified in JIS K6251 4.1. Using this as a sample, the tensile strength was measured with a tensile tester (product name: TENSILON RTF235, available from A&D Company, Limited) under stretching in the MD direction at a measurement temperature of 23° C. and a speed of 500 mm/min.

(3) Crosslinking Ratio (Gel Fraction)

Test pieces of about 100 mg were collected from the multilayer foam sheet, and the mass A (mg) of each test piece was accurately weighed. The test pieces were uniformly collected from the entire multilayer foam sheet. Then, the test piece was immersed in 30 cm$^3$ of xylene at 120° C. and allowed to stand for 24 hours and then filtered through a 200-mesh wire screen to collect the insoluble residue on the wire screen, followed by vacuum drying. The mass B (mg) of insoluble residue was accurately weighed. From the value obtained, the crosslinking ratio (mass %) was calculated by the following formula.

Gel fraction(mass %)=100×(B/A)

(4) Closed Cell Ratio

A flat square test piece with each side of 5 cm was cut out from the multilayer foam sheet. Then, the thickness of the test piece was measured to calculate the appearance volume V1 of the test piece, and the weight W1 of the test piece was measured. Next, the volume V2 of the cells was calculated based on the following formula. The density of the test piece is referred to as ρ (g/cm$^3$). Volume V2 of cells=V1−W1/ρ

Subsequently, the test piece was submerged into distilled water at 23° C. from the water surface to a depth of 500 mm, and a pressure of 15 kPa was applied to the test piece for 3 minutes. Thereafter, the test piece was taken out of water, water adhering to the surface of the test piece was removed, and the weight W2 of the test piece was measured, to calculate the closed cell ratio F1 based on the following formula.

Closed cell ratio F1(%)=100−100×(W2−W1)/V2

(5) Average Cell Diameter

The multilayer foam sheet was cut in the thickness direction along each of MD and TD, and a 200-fold enlarged image was captured using a digital microscope (product name: "VHX-900" available from KEYENCE CORPORATION). In the captured enlarged image, the MD cell diameter and the TD cell diameter of all cells present on the cut surface with a length of 2 mm in each of MD and TD were measured, and the same operation was repeated 5 times. Then, the average of the cell diameters in each of MD and TD of all cells was taken as the average cell diameter in MD and TD.

(6) Apparent Density and Expansion Ratio

The apparent density of the multilayer foam layer was measured according to JIS K 7222, and the inverse thereof was taken as the expansion ratio. Further, the overall density (apparent density) of the multilayer foam sheet was also measured according to JIS K 7222.

[Evaluation]

7) Impact Resistance Test (Tumbling Test)

The foam sheet produced in each of Examples and Comparative Examples was cut out into two pieces each having a size of a length of 0.15 cm and a width of 7 cm to produce test pieces (thickness: described in Table 1). The two test pieces were disposed at intervals of 5 cm, and two acrylic plates (length: 9.5 cm, width: 7 cm) were sandwiched while being vertically shifted by 1.5 cm and fixed with a pressure-sensitive adhesive, to obtain a test piece for tumbling.

The test piece for tumbling was put into a commercially available 18-litre drum (length of each side of the top plate and the bottom plate: about 24 cm, height: about 35 cm), and it was rotated 500 times to perform 1000 continuous drops. Thereafter, the test piece was taken out and visually observed for breakage between foam sheet layers. Evaluation criteria are as follows.

Good: No breakage was observed between foam sheet layers.

Poor: Breakage was observed between foam sheet layers.

Further, the aforementioned rotation/drop test was performed until the drop sound changes due to the splitting of the acrylic plate joint in two sheets following the breakage of the foam sheet, to evaluate specific numerical values by the number of times when the drop sound changed. Accordingly, in the case where the drop sound changes at 1000 rotations, the evaluation result is 2000 drops.

The materials used in Examples and Comparative Examples are as follows.

HDPE-2100JP: High-density polyethylene resin (product name "HI-ZEX 2100JP" available from Prime Polymer Co., Ltd.)

PP-E-333GV: Random polypropylene resin (product name "E-333GV" available from Prime Polymer Co., Ltd.)

LDPE-LF441: Low-density polyethylene resin (product name "NOVATEC LF-411" available from Japan Polyethylene Corporation)

LLDPE-2022D: Linear low-density polyethylene resin (product name "ULTZEX 2022D" available from Prime Polymer Co., Ltd.)

m-LLDPE: Linear low-density polyethylene produced using a metallocene catalyst (product name "KERNEL KF283" available from Japan Polyethylene Corporation)

Thermally decomposable foaming agent: azodicarbonamide

Decomposition temperature regulator: Zinc oxide, product name "OW-212F" (available from Sakai Chemical Industry Co., Ltd.)

Antioxidant: Phenolic antioxidant, 2,6-di-t-butyl-p-cresol

Example 1-1

First, second, and third extruders were provided.

Next, 10 parts by mass of the thermally decomposable foaming agent, 1 part by mass of the decomposition temperature regulator, and 0.5 parts by mass of the antioxidant, with respect to 100 parts by mass of LLDPE, were supplied to the first and second extruders as a foamable resin composition for forming foam layers, followed by melt-kneading at 130° C., to produce a foamable resin composition. Next, the same LLDPE as above was supplied to the third extruder as a resin for resin layer, followed by melt-kneading at 130° C.

The foamable resin composition from the first and second extruders and LLDPE from the third extruder were coextruded, and a 70-μm foamable resin sheet was stacked on each of both sides of a 60-μm resin layer sheet, to obtain a 200-μm multilayer sheet.

Next, each of both sides of the multilayer sheet was irradiated with 6.5 Mrad of electron beam at an acceleration voltage of 500 keV for crosslinking. Next, the crosslinked multilayer sheet was heated with hot air and an infrared heater and was continuously fed into a foaming furnace maintained at 250° C. for foaming, to obtain a multilayer foam sheet of Example 1. Table 1 shows the results evaluated by the aforementioned method.

Example 1-2

A 190-μm multilayer sheet was obtained in the same manner as in Example 1, except that the amount of the thermally decomposable foaming agent was changed to 9 parts by mass, the thickness of the resin layer sheet was changed to 30 μm, and the thickness of the foamable resin sheet was changed to 80 μm, in Example 1-1. Next, a multilayer foam sheet was obtained in the same manner as in Example 1-1, except that each of both sides of the multilayer sheet was irradiated with 6 Mrad of electron beam at an acceleration voltage of 500 keV for crosslinking. Table 1 shows the evaluation results.

Example 1-3

A 250-μm multilayer sheet was obtained in the same manner as in Example 1, except that the amount of the thermally decomposable foaming agent was changed to 9 parts by mass, the thickness of the resin layer sheet was changed to 90 μm, and the thickness of the foamable resin sheet was changed to 80 μm, in Example 1-1. Next, a multilayer foam sheet was obtained in the same manner as in Example 1-1, except that each of both sides of the multilayer sheet was irradiated with 6 Mrad of electron beam at an acceleration voltage of 500 keV for crosslinking. Table 1 shows the evaluation results.

Example 1-4

A 190-μm multilayer sheet was obtained in the same manner as in Example 1, except that the amount of the thermally decomposable foaming agent was changed to 12 parts by mass, the thickness of the resin layer sheet was changed to 50 μm, and the thickness of the foamable resin sheet was changed to 70 μm, in Example 1-1. Next, a multilayer foam sheet was obtained in the same manner as in Example 1-1, except that each of both sides of the multilayer sheet was irradiated with 6 Mrad of electron beam at an acceleration voltage of 500 keV for crosslinking. Table 1 shows the evaluation results.

Example 1-5

A 180-μm multilayer sheet was obtained in the same manner as in Example 1, except that the amount of the thermally decomposable foaming agent was changed to 8.5 parts by mass, the thickness of the resin layer sheet was changed to 40 μm, and the thickness of the foamable resin sheet was changed to 70 μm, in Example 1-1. Next, a multilayer foam sheet was obtained in the same manner as in Example 1-1, except that each of both sides of the multilayer sheet was irradiated with 6.5 Mrad of electron beam at an acceleration voltage of 500 keV for crosslinking. Table 1 shows the evaluation results.

Example 1-6

A 410-μm multilayer sheet was obtained in the same manner as in Example 1-1, except that the amount of the thermally decomposable foaming agent was changed to 12 parts by mass, the thickness of the resin layer sheet was changed to 150 μm, and the thickness of the foamable resin sheet was changed to 130 μm, in Example 1-1. Next, a multilayer foam sheet was obtained in the same manner as in Example 1-1, except that each of both sides of the multilayer sheet was irradiated with 5.5 Mrad of electron beam at an acceleration voltage of 500 keV for crosslinking. Table 1 shows the evaluation results.

Example 1-7

A 860-μm multilayer sheet was obtained in the same manner as in Example 1, except that the amount of the thermally decomposable foaming agent was changed to 7 parts by mass, the thickness of the resin layer sheet was changed to 400 µm, the thickness of the foamable resin sheet was changed to 230 µm, in Example 1-1. Next, a multilayer foam sheet was obtained in the same manner as in Example 1-1, except that each of both sides of the multilayer sheet was irradiated with 5.5 Mrad of electron beam at an acceleration voltage of 500 keV for crosslinking. Table 1 shows the evaluation results.

Example 1-8

A 150-µm multilayer sheet was obtained in the same manner as in Example 1, except that the amount of the thermally decomposable foaming agent was changed to 10 parts by mass, the thickness of the resin layer sheet was changed to 40 µm, and the thickness of the foamable resin sheet was changed to 55 µm, in Example 1-1. Next, a multilayer foam sheet was obtained in the same manner as in Example 1-1, except that each of both sides of the multilayer sheet was irradiated with 5.5 Mrad of electron beam at an acceleration voltage of 500 keV for crosslinking. Table 1 shows the evaluation results.

Example 1-9

A multilayer foam sheet was obtained in the same manner as in Example 1-1, except that the resin for a resin layer was changed to LDPE-LF411 in Example 1-1. Table 1 shows the evaluation results.

Example 1-10

A multilayer foam sheet was obtained in the same manner as in Example 1-1, except that the resin for a resin layer was changed to LLDPE-2022D in Example 1-1. Table 1 shows the evaluation results.

Example 1-11

A multilayer foam sheet was obtained in the same manner as in Example 1-1, except that the resin for a resin layer was changed to HDPE-2100JP in Example 1. Table 1 shows the evaluation results.

Example 1-12

A multilayer foam sheet was obtained in the same manner as in Example 1-1, except that the resin for a resin layer was changed to PP-E-333GV in Example 1-1. Table 1 shows the evaluation results.

Comparative Example 1-1

A single-layer foam sheet was obtained in the same manner as in Example 1-1, except that only the first extruder was used, the extrusion thickness was changed to 170 µm, and the amount of the thermally decomposable foaming agent was changed to 2.5 parts by mass, in Example 1-1. Table 1 shows the evaluation results.

Comparative Example 1-2

A single-layer foam sheet was obtained in the same manner as in Example 1-1, except that only the first extruder was used, the extrusion thickness was changed to 300 µm, and the amount of the thermally decomposable foaming agent was changed to 3.5 parts by mass, in Example 1-1. Table 1 shows the evaluation results.

Comparative Example 1-3

A single-layer foam sheet was obtained in the same manner as in Example 1-1, except that only the first extruder was used, the extrusion thickness was changed to 400 µm, and the amount of the thermally decomposable foaming agent was changed to 4.5 parts by mass, in Example 1-1. Table 1 shows the evaluation results.

Comparative Example 1-4

A 510-µm multilayer sheet was obtained in the same manner as in Example 1-1, except that the amount of the thermally decomposable foaming agent was changed to 10 parts by mass, the thickness of the resin layer sheet was changed to 370 µm, and the thickness of the foamable resin sheet was changed to 70 µm, in Example 1-1. Next, a multilayer foam sheet was obtained in the same manner as in Example 1, except that each of both sides of the multilayer sheet was irradiated with 6.5 Mrad of electron beam at an acceleration voltage of 1000 keV for crosslinking. Table 1 shows the evaluation results.

Comparative Example 1-5

A 166-µm multilayer sheet was obtained in the same manner as in Example 1, except that the amount of the thermally decomposable foaming agent was changed to 9.5 parts by mass, the thickness of the resin layer sheet was changed to 6 µm, and the thickness of the foamable resin sheet was changed to 80 µm, in Example 1-1. Next, a multilayer foam sheet was obtained in the same manner as in Example 1-1, except that each of both sides of the multilayer sheet was irradiated with 6.5 Mrad of electron beam at an acceleration voltage of 1000 keV for crosslinking. Table 1 shows the evaluation results.

TABLE 1

| | | | Example | | | | | | | | |
|---|---|---|---|---|---|---|---|---|---|---|---|
| | | | 1-1 | 1-2 | 1-3 | 1-4 | 1-5 | 1-6 | 1-7 | 1-8 | 1-9 |
| Configuration | Foam layer (outer layer) | Resin composition | m-LLDPE | m-LLDPE | m-LLDPE | m-LLDPE | m-LLDPE | m-LLDPE | m-LLDPE | m-LLDPE | m-LLDPE |
| | | Thickness (µm) | 80 | 90 | 90 | 85 | 85 | 250 | 450 | 60 | 80 |
| | | Expansion ratio (cm$^3$/g) | 1.8 | 1.8 | 1.8 | 2.2 | 1.6 | 5 | 8 | 1.6 | 1.8 |
| | | Apparent density (g/cm$^3$) | 0.56 | 0.56 | 0.56 | 0.45 | 0.63 | 0.20 | 0.13 | 0.63 | 0.56 |
| | Resin layer (middle | Resin composition | m-LLDPE | m-LLDPE | m-LLDPE | m-LLDPE | m-LLDPE | m-LLDPE | m-LLDPE | m-LLDPE | LDPE-LF441 |
| | | Thickness (µm) | 40 | 20 | 60 | 30 | 30 | 50 | 100 | 30 | 40 |

TABLE 1-continued

|  |  |  |  |  |  |  |  |  |  |  |  |
|---|---|---|---|---|---|---|---|---|---|---|---|
|  | layer) | Expansion ratio (cm³/g) | 1 | 1 | 1 | 1 | 1 | 1 | 1 | 1 | 1 |
|  |  | Apparent density (g/cm³) | 1 | 1 | 1 | 1 | 1 | 1 | 1 | 1 | 1 |
|  | Sheet | Total thickness (μm) | 200 | 200 | 240 | 200 | 200 | 550 | 1000 | 150 | 200 |
|  |  | Layer ratio (outer layer/middle layer) | 2 | 4.5 | 1.5 | 2.8 | 2.8 | 5 | 4.5 | 2 | 2 |
|  |  | Overall density (g/cm³) | 0.64 | 0.6 | 0.67 | 0.54 | 0.68 | 0.27 | 0.21 | 0.70 | 0.64 |
| Physical properties of sheet | | Gel fraction (%) | 60 | 55 | 58 | 48 | 71 | 58 | 53 | 48 | 65 |
|  |  | Average cell diameter (μm) | 123 | 112 | 126 | 131 | 96 | 196 | 274 | 101 | 121 |
|  |  | Closed cell ratio(%) | 97 | 98 | 96 | 97 | 98 | 97 | 98 | 98 | 93 |
|  |  | 25% compressive strength (kPa) | 746 | 561 | 911 | 651 | 881 | 542 | 581 | 791 | 772 |
|  |  | MD TENSILE STRENGTH AT BREAK (N/10 mm) | 34.7 | 32.3 | 43.1 | 28.9 | 36.7 | 40.4 | 57.3 | 28.3 | 28.9 |
| Evaluation results | | Impact resistance (tumbling test) | 2196 | 1621 | 2311 | 1021 | 2901 | 1511 | 2621 | 872 | 1311 |
|  |  | Performance evaluation | Good | Good | Good | Good | Good | Good | Good | Good | Good |

|  |  |  | Example | | | Comparative Example | | | | |
|---|---|---|---|---|---|---|---|---|---|---|
|  |  |  | 1-10 | 1-11 | 1-12 | 1-1 | 1-2 | 1-3 | 1-4 | 1-5 |
| Configuration | Foam layer (outer layer) | Resin composition | m-LDPE | m-LLDPE | m-LLDPE | — | — | — | m-LLDPE | m-LLDPE |
|  |  | Thickness (μm) | 80 | 80 | 80 | — | — | — | 85 | 98 |
|  |  | Expansion ratio (cm³/g) | 1.8 | 1.8 | 1.8 | — | — | — | 1.8 | 1.8 |
|  |  | Apparent density (g/cm³) | 0.56 | 0.56 | 0.56 | — | — | — | 0.56 | 0.56 |
|  | Resin layer (middle layer) | Resin composition | LLDPE-2022D | HDPPE-2100JP | PP-E-333GV | m-LLDPE | m-LLDPE | m-LLDPE | m-LLDPE | m-LLDPE |
|  |  | Thickness (μm) | 40 | 40 | 40 | 200 | 500 | 800 | 250 | 4 |
|  |  | Expansion ratio (cm³/g) | 1 | 1 | 1 | 1.8 | 5 | 8 | 1 | 1 |
|  |  | Apparent density (g/cm³) | 1 | 1 | 1 | 0.56 | 0.20 | 0.13 | 1 | 1 |
|  | Sheet | Total thickness (μm) | 200 | 200 | 200 | 200 | 500 | 800 | 420 | 200 |
|  |  | Layer ratio (outer layer/middle layer) | 2 | 2 | 2 | — | — | — | 0.3 | 24.5 |
|  |  | Overall density (g/cm³) | 0.64 | 0.64 | 0.64 | 0.56 | 0.20 | 0.13 | 0.82 | 056 |
| Physical properties of sheet | | Gel fraction (%) | 65 | 59 | 54 | 43 | 62 | 38 | 58 | 54 |
|  |  | Average cell diameter (μm) | 109 | 114 | 123 | 128 | 198 | 231 | 112 | 109 |
|  |  | Closed cell ratio(%) | 97 | 97 | 98 | 98 | 98 | 98 | 99 | 97 |
|  |  | 25% compressive strength (kPa) | 801 | 793 | 796 | 560 | 88 | 59 | >1000 | >1000 |
|  |  | MD TENSILE STRENGTH AT BREAK (N/10 mm) | 35.2 | 33.4 | 35.6 | 32.5 | 29.2 | 29.2 | 92.8 | 30.4 |
| Evaluation results | | Impact resistance (tumbling test) | 1421 | 1621 | 1021 | 241 | 181 | 221 | 3021 | 321 |
|  |  | Performance evaluation | Good | Good | Good | Poor | Poor | Poor | Good | Poor |

As described above, it can be seen that the multilayer foam sheet of each example according to the first invention is a foam sheet having high impact resistance and flexibility. Meanwhile, the sheet of each of Comparative Examples 1-1 to 1-3 is a single-layer foam sheet having poor impact resistance. Further, it can be seen that the multilayer foam sheet of Comparative Example 1-4 has a 25% compressive strength of over 1000 kPa due to the large thickness of the resin layer, thereby having poor flexibility. Further, it can be seen that the multilayer foam sheet of Comparative Example 1-5 has a thickness of the resin layer of less than 10 μm and therefore has poor impact resistance.

Examples According to Second Invention

[Physical Properties after Molding]
(1) 25% Compressive Strength
It was measured by the same method under the same measurement conditions as in the first invention.
(2) Tension Value at 1% Tension
Using a TENSILON tester, the tension when the multilayer foam sheet was stretched 1% in the MD direction was measured.
(3) Crosslinking Ratio (Gel Fraction)
It was measured by the same method under the same measurement conditions as in the first invention.

(4) Closed Cell Ratio

It was measured by the same method under the same measurement conditions as in the first invention.

(5) Average Cell Diameter

It was measured by the same method under the same measurement conditions as in the first invention.

(6) Apparent Density and Expansion Ratio

The apparent density of the multilayer foam sheet was measured according to JIS K 7222, and the inverse thereof was taken as the expansion ratio.

[Evaluation]

(7) Waterproofness (Water Resistance)

The water resistance of the multilayer foam sheet produced in each of Examples and Comparative Examples was evaluated according to JIS C 0920. A spacer with a thickness of 0.05 mm was interposed between a foam layer and an acrylic plate of the multilayer foam sheet produced in each of Examples and Comparative Examples, and the waterproofness was tested with 25% compression. The evaluation criteria were as follows.

Very good: Water leakage can be prevented for more than 3 minutes.
Good: Water leakage can be prevented for 1 minute or more and less than 3 minutes.
Fair: Water leakage can be prevented for 30 seconds or more and less than 1 minute.
Poor: Water leaks in less than 30 seconds.

(8) Warpage

The multilayer foam sheet produced in each of Examples and Comparative Examples was transported by roll-to-roll under the condition of 50 N/m, to laminate a slip sheet. The multilayer foam sheet with the slip sheet laminated was placed on a flat desk, and the distance between the surface of the desk and the top of the multilayer foam sheet lifted was measured. The evaluation criteria were as follows.

Good: Less than 20 mm
Fair: 20 mm to 30 mm
Poor: Over 30 mm

The materials used in Examples and Comparative Examples are as follows.

HDPE: High-density polyethylene resin (product name "HI-ZEX 2100JP" available from Prime Polymer Co., Ltd.)
PP: Random polypropylene resin (product name "E-333GV" available from Prime Polymer Co., Ltd.)
LDPE: Low-density polyethylene resin (product name "NOVATEC LF-411" available from Japan Polyethylene Corporation)
LLDPE: Linear low-density polyethylene resin (product name "ULTZEX 2022D" available from Prime Polymer Co., Ltd.)
m-LLDPE: Linear low-density polyethylene produced using a metallocene catalyst (product name "KERNEL KF283" available from Japan Polyethylene Corporation)
Thermally decomposable foaming agent: azodicarbonamide
Decomposition temperature regulator: Zinc oxide, product name "OW-212F" (available from Sakai Chemical Industry Co., Ltd.)
Antioxidant: Phenolic antioxidant, 2,6-di-t-butyl-p-cresol Example 2-1

First, second, and third extruders were provided.

Next, 5 parts by mass of the thermally decomposable foaming agent, 1 part by mass of the decomposition temperature regulator, and 0.5 parts by mass of the antioxidant, with respect to 100 parts by mass of m-LLDPE, were supplied to the first and second extruders as a foamable resin composition for forming foam layers, followed by melt-kneading at 130° C., to produce a foamable resin composition. Next, HDPE for a resin layer was supplied to the third extruder, followed by melt-kneading at 130° C.

The foamable resin composition from the first and second extruders and HDPE from the third extruder were coextruded, and a 50-μm foam resin composition sheet was stacked on each of both sides of a 45-μm resin layer sheet, to obtain a multilayer sheet.

Next, each of both sides of the multilayer sheet was irradiated with 5 Mrad of electron beam at an acceleration voltage of 500 keV for crosslinking. Next, the sheet was heated to 250° C. so that the foamable resin composition sheet was foamed, to obtain a multilayer foam sheet of Example 1. Table 2 shows the results evaluated by the aforementioned method.

Example 2-2

The multilayer foam sheet of Example 2-2 was obtained in the same manner as in Example 2-1, except that the amount of the thermally decomposable foaming agent was changed to 8 parts by mass, the thickness of the resin layer sheet was changed to 120 μm, and the thickness of the foamable composition sheet was changed to 30 μm, in Example 2-1. Table 2 shows the evaluation results.

Example 2-3

A multilayer foam sheet was obtained in the same manner as in Example 2-2 except that the thickness of the resin layer sheet was changed to 80 μm in Example 2-2. Table 2 shows the evaluation results.

Example 2-4

A multilayer foam sheet was obtained in the same manner as in Example 2-1, except that the thickness of the foamable resin composition sheet was changed to 70 μm, and the thickness of the resin layer sheet was changed to 45 μm, in Example 2-1. Table 2 shows the evaluation results.

Example 2-5

A multilayer foam sheet was obtained in the same manner as in Example 2-2 except that the thickness of the foamable resin composition sheet was changed to 42 μm in Example 2-2. Table 2 shows the evaluation results.

Example 2-6

A multilayer foam sheet was obtained in the same manner as in Example 2-1, except that the amount of the thermally decomposable foaming agent was changed to 4 parts by mass, the thickness of the resin layer sheet was changed to 60 μm, and the thickness of the foamable resin composition sheet was changed to 265 μm, in Example 2-1. Table 2 shows the evaluation results.

Example 2-7

A multilayer foam sheet was obtained in the same manner as in Example 2-1, except that the amount of the thermally decomposable foaming agent was changed to 9 parts by mass, the thickness of the resin layer sheet was changed to 140 µm, and the thickness of the foamable resin composition sheet was changed to 180 µm, in Example 2-1. Table 2 shows the evaluation results.

Example 2-8

A multilayer foam sheet was obtained in the same manner as in Example 2-1, except that the amount of the thermally decomposable foaming agent was changed to 12 parts by mass, the thickness of the resin layer sheet was changed to 185 µm, and the thickness of the foamable resin composition sheet was changed to 155 µm, in Example 2-1. Table 2 shows the evaluation results.

Example 2-9

The resin for a resin layer was changed to random PP, and 3 parts by mass of a monomer was further supplied for melt-kneading in Example 2-1. In addition, a multilayer foam sheet was obtained in the same manner as in Example 2-1, except that the amount of the thermally decomposable foaming agent was changed to 8.0 parts by mass, the thickness of the resin layer sheet was changed to 120 µm, and the thickness of the foamable resin composition sheet was changed to 42 µm. Table 2 shows the evaluation results.

Example 2-10

A multilayer foam sheet was obtained in the same manner as in Example 2-1, except that the resin for a resin layer was changed to LDPE, and the thickness of the foamable resin composition sheet was changed to 110 µm, in Example 2-1. Table 2 shows the evaluation results.

Example 2-11

A multilayer foam sheet was obtained in the same manner as in Example 2-10 except that the resin for a resin layer was changed to LLDPE in Example 2-10. Table 2 shows the evaluation results.

Example 2-12

A multilayer foam sheet was obtained in the same manner as in Example 2-1, except that the resin for a resin layer was changed to LLDPE, the amount of the thermally decomposable foaming agent was changed to 6.5 parts by mass, the thickness of the resin layer sheet was changed to 400 µm, and the thickness of the foamable resin composition sheet was changed to 112 µm, in Example 2-1. Table 2 shows the evaluation results.

Example 2-13

A multilayer foam sheet was obtained in the same manner as in Example 2-1, except that the resin for a resin layer was changed to m-LLDPE, and the thickness of the foamable resin composition sheet was changed to 110 µm, in Example 2-1. Table 2 shows the evaluation results.

Comparative Example 2-1

100 parts by mass of the polyolefin resin, 2.5 parts by mass of the thermally decomposable foaming agent, 1 part by mass of the decomposition temperature regulator, and 0.5 parts by mass of the phenolic antioxidant were provided as raw materials for foam layers. HYBRAR 7311F, available from KURARAY CO., LTD., as an elastomer and a linear low-density polyethylene resin (product name "KERNEL KF283" available from Japan Polyethylene Corporation) obtained by a polymerization catalyst of a metallocene compound as a polyolefin resin were used. Further, azodicarbonamide was used as a thermally decomposable foaming agent, and zinc oxide (product name "OW-212F" available from Sakai Chemical Industry Co., Ltd.) was used as a decomposition temperature regulator. As a phenolic antioxidant, 2,6-di-t-butyl-p-cresol was used. These materials were melt-kneaded, followed by pressing, to obtain a foamable resin composition sheet with a thickness of 0.29 mm.

The foamable resin composition sheet obtained was irradiated with 5 Mrad of electron beam at an acceleration voltage of 500 keV for crosslinking. Next, the sheet was heated to 250° C. so that the foamable resin composition sheet was foamed, to obtain a single-layer foam sheet of Comparative Example 1. Table 2 shows the evaluation results.

Comparative Example 2-2

A single-layer foam sheet was obtained in the same manner as in Comparative Example 2-1 except that the amount of the thermally decomposable foaming agent was changed to 3.5 parts by mass, the thickness of the foamable resin composition sheet was changed to 0.36 mm, and the quantity of radiation was changed to 4 Mrad, in Comparative Example 2-1. Table 2 shows the evaluation results.

Comparative Example 2-3

A single-layer foam sheet was obtained in the same manner as in Comparative Example 2-1 except that in Comparative Example 2-1, the amount of the thermally decomposable foaming agent was changed to 5.0 parts by mass, the thickness of the foamable resin composition sheet was changed to 0.35 mm, and the quantity of radiation of electron beam was changed to 4 Mrad. Table 2 shows the evaluation results.

Comparative Example 2-4

A single-layer foam sheet was obtained in the same manner as in Comparative Example 2-1 except that the amount of the thermally decomposable foaming agent was changed to 6.5 parts by mass, the thickness of the foamable resin composition sheet was changed to 0.45 mm, and the quantity of radiation of electron beam was changed to 4 Mrad, in Comparative Example 2-1. Table 2 shows the evaluation results.

Comparative Example 2-5

100 parts by mass of the olefin resin was melt-kneaded, and then the thickness of the resin sheet was adjusted to 0.20 mm, to obtain a resin sheet of Comparative Example 2-5. Table 2 shows the evaluation results.

Comparative Example 2-6

8 parts by mass of the thermally decomposable foaming agent, 1 part by mass of the decomposition temperature regulator, and 0.5 parts by mass of the antioxidant, with respect to 100 parts by mass of LLDPE, were supplied to the first and second extruders as a foamable resin composition for forming foam layers, followed by melt-kneading at 130° C., to produce a foamable resin composition. Next, HDPE for a resin layer was supplied to the third extruder, followed by melt-kneading at 130° C.

The foamable resin composition from the first and second extruders and HDPE from the third extruder were coextruded, and a 50-μm foam resin composition sheet was stacked on each of both sides of a 600-μm resin layer sheet to obtain a multilayer sheet.

Next, each of both sides of the multilayer sheet was irradiated with 5 Mrad of electron beam at an acceleration voltage of 500 keV for crosslinking. Next, the sheet was heated to 250° C. so that the foamable resin composition sheet was foamed, to obtain a multilayer foam sheet of Comparative Example 2-6. Table 2 shows the evaluation results.

TABLE 2

| | | | Example | | | | | | | | | | |
|---|---|---|---|---|---|---|---|---|---|---|---|---|---|
| | | | 2-1 | 2-2 | 2-3 | 2-4 | 2-5 | 2-6 | 2-7 | 2-8 | 2-9 | 2-10 |
| Configuration | Foam layer (outer layer) | Resin composition | m-LLDPE | m-LLDPE | m-LLDPE | m-LLDPE | m-LLDPE | m-LLDPE | m-LLDPE | m-LLDPE | m-LLDPE | m-LLDPE |
| | | Thickness (μm) | 60 | 60 | 60 | 85 | 85 | 385 | 385 | 400 | 85 | 135 |
| | | Expansion ratio ($cm^3/g$) | 1.8 | 8.0 | 8.0 | 1.8 | 8.0 | 3.0 | 10.0 | 15.0 | 8.0 | 1.8 |
| | | Density ($g/cm^3$) | 0.56 | 0.13 | 0.13 | 0.56 | 0.13 | 0.33 | 0.10 | 0.07 | 0.13 | 0.56 |
| | Resin layer (middle layer) | Resin composition | HDPE | HDPE | HDPE | HDPE | HDPE | HDPE | HDPE | HDPE | PP | LDPE |
| | | Thickness (μm) | 30 | 30 | 20 | 30 | 30 | 30 | 30 | 10 | 30 | 30 |
| | | Expansion ratio ($cm^3/g$) | 1 | 1 | 1 | 1 | 1 | 1 | 1 | 1 | 1 | 1 |
| | | Density ($g/cm^3$) | 1 | 1 | 1 | 1 | 1 | 1 | 1 | 1 | 1 | 1 |
| | Sheet | Total thickness (μm) | 150 | 150 | 140 | 200 | 200 | 800 | 800 | 810 | 200 | 300 |
| | | Layer ratio (outer layer/middle layer) | 2.0 | 2.0 | 3.0 | 2.8 | 2.8 | 12.8 | 12.8 | 40.0 | 2.8 | 4.5 |
| Physical properties of sheet | | Gel fraction(%) | 55 | 40 | 40 | 58 | 58 | 58 | 58 | 58 | 58 | 58 |
| | | Average cell diameter (μm) | 117 | 127 | 127 | 109 | 157 | 132 | 232 | 268 | 129 | 111 |
| | | Closed cell ratio(%) | 98 | 97 | 97 | 96 | 96 | 96 | 96 | 96 | 96 | 96 |
| | | 25% compressive strength (kPa) | 776 | 103 | 93 | 641 | 94 | 247 | 72 | 36 | 94 | 546 |
| | | Tension value upon stretching by 1% (N/10 mm) | 1.38 | 1.10 | 0.75 | 1.52 | 1.12 | 2.22 | 1.32 | 0.52 | 1.28 | 1.16 |
| Evaluation results | | Waterproofness | Very good | Good | Good | Very good | Good | Very good | Fair | Fair | Good | Very good |
| | | Warpage | Good | Good | Good | Good | Good | Good | Good | Fair | Good | Good |

| | | | Example | | | Comparative Example | | | | | |
|---|---|---|---|---|---|---|---|---|---|---|---|
| | | | 2-11 | 2-12 | 2-13 | 2-1 | 2-2 | 2-3 | 2-4 | 2-5 | 2-6 |
| Configuration | Foam layer (outer layer) | Resin composition | m-LLDPE | m-LLDPE | m-LLDPE | — | — | — | — | — | m-LLDPE |
| | | Thickness (μm) | 135 | 225 | 135 | — | — | — | — | — | 100 |
| | | Expansion ratio ($cm^3/g$) | 1.8 | 8.0 | 1.8 | — | — | — | — | — | 8.0 |
| | | Density ($g/cm^3$) | 0.56 | 0.13 | 0.56 | — | — | — | — | — | 0.13 |
| | Resin layer (middle layer) | Resin composition | LLDPE | LLDPE | m-LLDPE | m-LLDPE | m-LLDPE | m-LLDPE | m-LLDPE | m-LLDPE | HDPE |
| | | Thickness (μm) | 30 | 100 | 30 | 150 | 300 | 400 | 500 | 200 | 500 |
| | | Expansion ratio ($cm^3/g$) | 1 | 1 | 1 | 1.8 | 5 | 8 | 10 | 1 | 1 |
| | | Density ($g/cm^3$) | 1 | 1 | 1 | 0.56 | 0.20 | 0.13 | 0.10 | 1 | 1 |
| | Sheet | Total thickness (μm) | 300 | 550 | 300 | 150 | 300 | 400 | 500 | 200 | 700 |

TABLE 2-continued

|  |  |  |  |  |  |  |  |  |  |  |
|---|---|---|---|---|---|---|---|---|---|---|
|  | Layer ratio (outer layer/middle layer) | 4.5 | 2.3 | 4.5 | — | — | — | — | — | 0.2 |
| Physical properties of sheet | Gel fraction(%) | 58 | 58 | 58 | 52 | 38 | 34 | 37 | 36 | 58 |
|  | Average cell diameter (μm) | 103 | 104 | 104 | 101 | 134 | 142 | 144 | — | 232 |
|  | Closed cell ratio(%) | 96 | 96 | 96 | 98 | 98 | 98 | 98 | — | 96 |
|  | 25% compressive strength (kPa) | 574 | 101 | 528 | 560 | 80 | 36 | 35 | >1000 | >1000 |
|  | Tension value upon stretching by 1% (N/10 mm) | 1.09 | 1.28 | 0.94 | 0.43 | 0.25 | 0.19 | 0.18 | 1.16 | 17.44 |
| Evaluation results | Waterproofness | Very good | Good | Very good | Very good | Good | Good | Fair | Poor | Poor |
|  | Warpage | Good | Good | Good | Poor | Poor | Poor | Poor | Good | Good |

As described above, it can be seen that the multilayer foam sheet of each example according to the second invention has high waterproofness and easy handling with no warpage even when laminated with slip sheets.

Meanwhile, the single-layer foam sheet of each of Comparative Examples 2-1 to 2-4 has no resin layer, and therefore the tension value upon stretching by 1% is less than 0.50 N/10 mm, resulting in failure to obtain a satisfactory warpage evaluation. Further, the non-foamed single-layer sheet of Comparative Example 2-5 corresponds to the sheet with only the resin layer in the multilayer foam sheet of the present invention (second invention), and the 25% compressive strength is over 1000 kPa, resulting in poor flexibility, so that waterproofness cannot be exhibited.

Further, Comparative Example 2-6 is a multilayer foam sheet, but since the thickness of the resin layer is large, the 25% compressive strength is over 1000 kPa, and the waterproofness is evaluated to be low.

Examples According to Third Invention

[Physical Properties after Molding]
(1) 25% Compressive Strength

It was measured at a measurement temperature of 23° C. by a method according to JIS K 6767.

(2) MD Tensile Strength at Break

It was measured by the same method under the same measurement conditions as in the first invention.

(3) Crosslinking Ratio (Gel Fraction)

It was measured by the same method under the same measurement conditions as in the first invention.

(4) Closed Cell Ratio

It was measured by the same method under the same measurement conditions as in the first invention.

(5) Apparent Density and Expansion Ratio

It was measured by the same method under the same measurement conditions as in the first invention.

[Evaluation]
(6) Waterproofness (Water Resistance)

It was measured by the same method under the same measurement conditions as in the second invention.

(7) Handling Evaluation

The tensile strength at break in each of the MD and TD directions was measured under the same conditions as the MD tensile strength at break described above. The tensile strength at break in the TD direction and the tensile strength at break in the MD direction were determined according to the following evaluation criteria.

Good: The tensile strength at break in the TD direction is 75% or more with respect to the tensile strength at break in the MD direction Poor: The tensile strength at break in the TD direction is less than 75% with respect to the tensile strength at break in the MD direction The materials used in Examples and Comparative Examples are as follows.

HDPE-2100JP: High-density polyethylene resin (product name "HI-ZEX 2100JP" available from Prime Polymer Co., Ltd.)

PP-E-333GV: Random polypropylene resin (product name "E-333GV" available from Prime Polymer Co., Ltd.)

LDPE-LF441: Low-density polyethylene resin (product name "NOVATEC LF-441" available from Japan Polyethylene Corporation)

LDPE-LF128: Low-density polyethylene resin (product name "NOVATEC LF-128" available from Japan Polyethylene Corporation)

LLDPE-2022D: Linear low-density polyethylene resin (product name "ULTZEX 2022D" available from Prime Polymer Co., Ltd.)

m-LLDPE: Linear low-density polyethylene produced using a metallocene catalyst (product name "KERNEL KF283" available from Japan Polyethylene Corporation)

Thermally decomposable foaming agent: azodicarbonamide

Decomposition temperature regulator: Zinc oxide, product name "OW-212F" (available from Sakai Chemical Industry Co., Ltd.)

Antioxidant: Phenolic antioxidant, 2,6-di-t-butyl-p-cresol

Example 3-1

First, second, and third extruders were provided.

Next, 7 parts by mass of the thermally decomposable foaming agent, 1 part by mass of the decomposition temperature regulator, and 0.5 parts by mass of the antioxidant, with respect to 100 parts by mass of LLDPE, were supplied to the first and second extruders as a foamable resin composition for forming foam layers, followed by melt-kneading at 130° C., to produce a foamable resin composition. Next, the same LLDPE as above was supplied to the third extruder as a resin for resin layer, followed by melt-kneading at 130° C.

The foamable resin composition from the first and second extruders and LLDPE from the third extruder were coextruded, and a 65-μm foam resin composition sheet was stacked on each of both sides of a 60-μm resin layer sheet, to obtain a 190-μm multilayer sheet.

Next, each of both sides of the multilayer sheet was irradiated with 6.0 Mrad of electron beam at an acceleration voltage of 500 keV for crosslinking. Next, the crosslinked multilayer sheet was heated with an infrared heater and was continuously fed into a foaming furnace maintained at 250° C. for foaming, to obtain the multilayer foam sheet of Example 1. Table 3 shows the results evaluated by the aforementioned method.

Example 3-2

A multilayer foam sheet was obtained in the same manner as in Example 3-1, except that the amount of the thermally decomposable foaming agent was changed to 8 parts by mass in Example 3-1. Table 3 shows the evaluation results.

Example 3-3

A multilayer foam sheet was obtained in the same manner as in Example 3-1, except that the amount of the thermally decomposable foaming agent was changed to 8 parts by mass, the thickness of the resin layer sheet was changed to 90 μm, and the thickness of the foamable composition sheet was changed to 160 μm, in Example 3-1. Table 3 shows the evaluation results.

Example 3-4

A multilayer foam sheet was obtained in the same manner as in Example 3-1, except that the amount of the thermally decomposable foaming agent was changed to 6.5 parts by mass, and the thickness of the resin layer sheet was changed to 300 μm, in Example 3-1. Table 3 shows the evaluation results.

Example 3-5

A multilayer foam sheet was obtained in the same manner as in Example 3-1, except that the resin for a resin layer was changed to HDPE-2100JP in Example 3-1. Table 3 shows the evaluation results.

Example 3-6

A multilayer foam sheet was obtained in the same manner as in Example 3-1, except that the resin for a resin layer was changed to LDPE-LF441 in Example 3-1. Table 3 shows the evaluation results.

Example 3-7

A multilayer foam sheet was obtained in the same manner as in Example 3-1, except that the resin for a resin layer was changed to LDPE-LF128 in Example 3-1. Table 3 shows the evaluation results.

Example 3-8

A multilayer foam sheet was obtained in the same manner as in Example 3-1, except that the resin for a resin layer was changed to PP-E-333GV in Example 3-1. Table 3 shows the evaluation results.

Example 3-9

A multilayer foam sheet was obtained in the same manner as in Example 3-1, except that the resin for a resin layer was changed to LLDPE-2022D in Example 3-1. Table 3 shows the evaluation results.

Comparative Example 3-1

A single-layer foam sheet was obtained in the same manner as in Example 3-1 except that only the first extruder was used, and the extrusion thickness was changed to 200 μm, in Example 3-1. Table 3 shows the evaluation results.

Comparative Example 3-2

A single-layer foam sheet was obtained in the same manner as in Comparative Example 3-1 except that the amount of the thermally decomposable foaming agent was changed to 6.5 parts by mass in Comparative Example 3-1. Table 3 shows the evaluation results.

Comparative Example 3-3

A single-layer foam sheet was obtained in the same manner as in Comparative Example 3-1 except that only the first extruder was used, the extrusion thickness was changed to 300 μm, the amount of the thermally decomposable foaming agent was changed to 7.5 parts by mass, in Comparative Example 3-1. Table 3 shows the evaluation results.

Comparative Example 3-4

6.5 parts by mass of the thermally decomposable foaming agent, 1 part by mass of the decomposition temperature regulator, and 0.5 parts by mass of the antioxidant, with respect to 100 parts by mass of m-LLDPE, were supplied to the third extruder as a resin composition for forming middle layer in Example 3-1, followed by melt-kneading at 130° C. The same m-LLDPE as above was supplied to the first and second extruders as a resin composition for outer layers, followed by melt-kneading at 130° C. As a resin for outer layers, m-LLDPE from the first and second extruders and the aforementioned resin composition for middle layer from the third extruder were coextruded, and a 200-μm outer layer sheet was stacked on each of both sides of a 60-μm middle layer sheet, to obtain a multilayer sheet.

Next, each of both sides of the multilayer sheet was irradiated with 6.0 Mrad of electron beam at an acceleration voltage of 500 keV for crosslinking. Next, the crosslinked multilayer sheet was heated with an infrared heater and was continuously fed into a foaming furnace maintained at 250° C. for foaming, to obtain the multilayer foam sheet of Comparative Example 3-4. Table 3 shows the results evaluated by the aforementioned method.

Comparative Example 3-5

A 166-μm multilayer sheet was obtained in the same manner as in Example 3-1, except that the amount of the thermally decomposable foaming agent was changed to 9.5 parts by mass, the thickness of the resin layer sheet was changed to 6 μm, and the thickness of the foamable composition sheet was changed to 80 μm in Example 3-1. Next, a multilayer foam sheet was obtained in the same manner as in Example 3-1, except that each of both sides of the multilayer sheet was irradiated with 6.5 Mrad of electron beam at an acceleration voltage of 1000 keV for crosslinking. Table 3 shows the evaluation results.

TABLE 3

| | | | Example | | | | | | |
|---|---|---|---|---|---|---|---|---|---|
| | | | 3-1 | 3-2 | 3-3 | 3-4 | 3-5 | 3-6 | 3-7 |
| Configuration | Foam layer (outer layer) | Resin composition | m-LLDPE | m-LLDPE | m-LLDPE | m-LLDPE | m-LLDPE | m-LLDPE | m-LLDPE |
| | | Thickness (μm) | 80 | 90 | 180 | 100 | 80 | 80 | 80 |
| | | Expansion ratio (cm$^3$/g) | 1.8 | 3 | 8 | 5 | 1.8 | 1.8 | 1.8 |
| | | Density (g/cm$^3$) | 0.56 | 0.33 | 0.13 | 0.20 | 0.56 | 0.56 | 0.56 |
| | Resin layer (middle layer) | Resin composition | m-LLDPE | m-LLDPE | m-LLDPE | m-LLDPE | HDPPE-2100JP | LDPE-LF441 | LDPE-LF128 |
| | | Thickness (μm) | 40 | 30 | 40 | 100 | 40 | 40 | 40 |
| | | Expansion ratio (cm$^3$/g) | 1 | 1 | 1 | 1 | 1 | 1 | 1 |
| | | Density (g/cm$^3$) | 1 | 1 | 1 | 1 | 1 | 1 | 1 |
| | Sheet | Total thickness (μm) | 200 | 210 | 400 | 300 | 200 | 200 | 200 |
| | | Layer ratio (outer layer/middle layer) | 2 | 3 | 4.5 | 1 | 2 | 2 | 2 |
| | | Overall density (g/cm$^3$) | 0.64 | 0.43 | 0.21 | 0.47 | 0.64 | 0.64 | 0.64 |
| Physical properties of sheet | | Gel fraction(%) | 60 | 55 | 58 | 40 | 71 | 63 | 38 |
| | | Closed cell ratio (%) | 97 | 98 | 96 | 97 | 98 | 97 | 98 |
| | | 25% compressive strength (kPa) | 746 | 373 | 94 | 120 | 820 | 785 | 953 |
| | | Tensile strength at break (MD) (N/10 mm) | 32.0 | 23.8 | 24.0 | 36.2 | 32.7 | 28.8 | 26.2 |
| | | Tensile strength at break (TD) (N/10 mm) | 27.6 | 19.8 | 18.5 | 34.5 | 24.8 | 23.4 | 23.4 |
| | | Ratio of tensile strength at break (MD/TD) | 1.16 | 1.20 | 1.30 | 1.05 | 1.32 | 1.23 | 1.12 |
| Evaluation results | | Waterproofness | Very good | Very good | Good | Good | Very good | Very good | Very good |
| | | Handling evaluation | Good | Good | Good | Good | Good | Good | Good |

| | | | Example | | Comparative Example | | | | |
|---|---|---|---|---|---|---|---|---|---|
| | | | 3-8 | 3-9 | 3-1 | 3-2 | 3-3 | 3-4 | 3-5 |
| Configuration | Foam layer (outer layer) | Resin composition | m-LLDPE | m-LLDPE | — | — | — | m-LLDPE | m-LLDPE |
| | | Thickness (μm) | 600 | 80 | — | — | — | 100 | 100 |
| | | Expansion ratio (cm$^3$/g) | 1.8 | 1.8 | — | — | — | 1 | 3 |
| | | Density (g/cm$^3$) | 0.56 | 0.56 | — | — | — | 1 | 0.33 |
| | Resin layer (middle layer) | Resin composition | PP-E-333GV | LLDPE-2022D | m-LLDPE | m-LLDPE | m-LLDPE | m-LLDPE | m-LLDPE |
| | | Thickness (μm) | 200 | 40 | 200 | 300 | 400 | 200 | 5 |
| | | Expansion ratio (cm$^3$/g) | 1 | 1 | 1.8 | 5 | 8 | 3 | 1 |
| | | Density (g/cm$^3$) | 1 | 1 | 0.56 | 0.2 | 0.13 | 0.33 | 1 |
| | Sheet | Total thickness (μm) | 1400 | 200 | 200 | 300 | 400 | 400 | 205 |
| | | Layer ratio (outer layer/middle layer) | 3 | 2 | — | — | — | 0.5 | 20 |
| | | Overall density (g/cm$^3$) | 0.62 | 0.64 | 0.56 | 0.2 | 0.13 | 0.67 | 0.35 |
| Physical properties of sheet | | Gel fraction(%) | 65 | 65 | 43 | 62 | 38 | 36 | 52 |
| | | Closed cell ratio (%) | 93 | 97 | 98 | 98 | 98 | 97 | 97 |
| | | 25% compressive strength (kPa) | 418 | 712 | 560 | 88 | 59 | 1175 | 285 |
| | | Tensile strength at break (MD) (N/10 mm) | 240.1 | 34.5 | 34.1 | 11.6 | 11.3 | 77.3 | 20.8 |
| | | Tensile strength at break (TD) (N/10 mm) | 222.3 | 30.0 | 23.4 | 7.7 | 5.9 | 52.5 | 14.1 |
| | | Ratio of tensile strength at break (MD/TD) | 1.08 | 1.15 | 1.46 | 1.51 | 1.92 | 1.47 | 1.48 |
| Evaluation results | | Waterproofness | Very good | Very good | Very good | Good | Good | Poor | Good |
| | | Handling evaluation | Good | Good | Poor | Poor | Poor | Good | Poor |

As described above, it can be seen that the multilayer foam sheet of each example according to the third invention has high waterproofness and good handleability.

Meanwhile, the single-layer foam of each of Comparative Example 3-1 to 3-3 has a MD/TD ratio of over 1.40, resulting in insufficient handleability. Further, the multilayer foam sheet of Comparative Example 3-4 has a 25% compressive strength of over 1000 kPa, resulting in poor waterproofness. The multilayer foam sheet of Comparative Example 3-5 has a MD/TD ratio of over 1.40, resulting in insufficient handleability.

The invention claimed is:

1. A multilayer foam sheet comprising:
   a resin layer; and
   a foam layer on each of both sides of the resin layer,
   wherein the resin layer has a thickness of 10 µm or more,
   wherein the multilayer foam sheet has a 25% compressive strength of 1000 kPa or less, and
   wherein the multilayer foam sheet has a ratio of MD tensile strength at break to TD tensile strength at break (MD/TD) of 1.40 or less.

2. The multilayer foam sheet according to claim 1, wherein the thickness of the resin layer is 20 µm or more.

3. The multilayer foam sheet according to claim 1, wherein a tensile strength at break in machine direction (MD) is 10 N/10 mm or more.

4. The multilayer foam sheet according to claim 1, wherein a density of the entire sheet is 0.1 to 0.8 g/cm$^3$.

5. The multilayer foam sheet according to claim 1, wherein a total thickness is in the range of 30 to 2000 µm.

6. The multilayer foam sheet according to claim 1, wherein a gel fraction is 30 to 80%.

7. The multilayer foam sheet according to claim 1, wherein a density of the foam layer is 0.05 to 0.7 g/cm$^3$.

8. The multilayer foam sheet according to claim 1, wherein a resin constituting the resin layer is a polyolefin resin.

9. The multilayer foam sheet according to claim 1, wherein a closed cell ratio of the foam layer is 90% or more.

10. The multilayer foam sheet according to claim 1, wherein a ratio of thicknesses of the foam layer to the resin layer (foam layer/resin layer) is 1 to 10.

11. The multilayer foam sheet according to claim 1, wherein the resin constituting the foam layer comprises a polyolefin resin, or a polyolefin resin and at least one selected from a thermoplastic elastomer and olefin rubber.

12. The multilayer foam sheet according to claim 1, wherein the MD tensile strength at break is 15 N/10 mm or more.

13. The multilayer foam sheet according to claim 1, wherein a density of the foam layer is 0.08 to 0.7 g/cm$^3$.

14. The multilayer foam sheet according to claim 1, wherein each of the resin layer and the foam layer comprises a polyolefin resin, or a polyolefin resin and at least one selected from a thermoplastic elastomer and olefin rubber.

15. The multilayer foam sheet according to claim 1, wherein a ratio of thicknesses of the foam layer to the resin layer (foam layer/resin layer) is 5 or less.

16. A pressure-sensitive adhesive tape comprising a pressure-sensitive adhesive material on at least one surface of the multilayer foam sheet according to claim 1.

17. A rolled product comprising the multilayer foam sheet according to claim 1.

* * * * *